(12) United States Patent
Klein et al.

(10) Patent No.: US 10,725,647 B2
(45) Date of Patent: Jul. 28, 2020

(54) FACILITATING INTERACTION WITH A COMPUTING DEVICE BASED ON FORCE OF TOUCH

(71) Applicant: Microsoft Technology Licensing, LLC, Redmond, WA (US)

(72) Inventors: Christian Klein, Duvall, WA (US); Robert Disano, Seattle, WA (US); Robert David Steen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 15/650,808

(22) Filed: Jul. 14, 2017

(65) Prior Publication Data
US 2019/0018532 A1    Jan. 17, 2019

(51) Int. Cl.
| G06F 3/0488 | (2013.01) |
|---|---|
| G09B 21/00 | (2006.01) |
| G06F 3/0482 | (2013.01) |
| G06F 3/0484 | (2013.01) |
| G06F 3/0485 | (2013.01) |
| G06F 3/0486 | (2013.01) |

(52) U.S. Cl.
CPC .......... *G06F 3/0488* (2013.01); *G06F 3/0482* (2013.01); *G06F 3/04842* (2013.01); *G06F 3/04845* (2013.01); *G09B 21/00* (2013.01); *G09B 21/008* (2013.01); *G06F 3/0485* (2013.01); *G06F 3/0486* (2013.01); *G06F 2203/04805* (2013.01); *G06F 2203/04806* (2013.01)

(58) Field of Classification Search
CPC .. G06F 3/0482; G06F 3/0484; G06F 3/04842; G06F 3/04845; G06F 3/048–04897
See application file for complete search history.

(56) References Cited

U.S. PATENT DOCUMENTS

| 8,477,109 | B1 * | 7/2013 | Freed | G06F 3/041 |
|---|---|---|---|---|
| | | | | 345/173 |
| 8,610,673 | B2 * | 12/2013 | Storrusten | G06F 3/0425 |
| | | | | 345/173 |
| 8,643,615 | B2 * | 2/2014 | Adamson | G06F 3/04883 |
| | | | | 345/173 |

(Continued)

OTHER PUBLICATIONS

Nicholas, "A Complete List of iOS Gestures Available to VoiceOver Users Basic Navigation Flick Up or Down", Retrieved from: https://web.archive.org/web/20170704122440/https://www.applevis.com/guides/ios-voiceover/complete-list-ios-gestures-available-voiceover-users, Mar. 8, 2017, 4 Pages.

(Continued)

*Primary Examiner* — Patrick F Marinelli
(74) *Attorney, Agent, or Firm* — Rainier Patents, P.S.

(57) ABSTRACT

A technique is described herein that allows a user to control a user interface presentation provided by a computing device based on a force-dependent manner in which the user engages a surface of a force-sensitive input device. This manner of control allows any user to efficiently interact with the computing device, but is particularly beneficial to users who have motor-related and/or vision-related disabilities.

6 Claims, 16 Drawing Sheets

(56) References Cited

U.S. PATENT DOCUMENTS

| | | | | |
|---|---|---|---|---|
| 8,749,510 B2* | 6/2014 | Park | | G06F 3/0488 345/173 |
| 8,773,389 B1* | 7/2014 | Freed | | G06F 3/041 345/173 |
| 10,013,094 B1* | 7/2018 | Smith | | G06F 3/0416 |
| 10,013,095 B1* | 7/2018 | Smith | | G06F 3/0416 |
| 10,031,607 B1* | 7/2018 | Smith | | G06F 3/0416 |
| 10,055,120 B2* | 8/2018 | Bostick | | G06F 17/211 |
| 10,120,480 B1* | 11/2018 | Smith | | G06F 3/0416 |
| 10,133,397 B1* | 11/2018 | Smith | | G06F 3/0416 |
| 10,146,353 B1* | 12/2018 | Smith | | G06F 3/0416 |
| 10,156,921 B1* | 12/2018 | Smith | | G06F 3/0416 |
| 10,162,448 B1* | 12/2018 | Smith | | G06F 3/0416 |
| 10,203,794 B1* | 2/2019 | Smith | | G06F 3/0416 |
| 10,203,868 B2* | 2/2019 | Bauer | | H04M 1/72522 |
| 10,209,806 B1* | 2/2019 | Smith | | G06F 3/0416 |
| 10,209,807 B1* | 2/2019 | Smith | | G06F 3/0416 |
| 10,209,808 B1* | 2/2019 | Smith | | G06F 3/0416 |
| 10,209,809 B1* | 2/2019 | Smith | | G06F 3/0416 |
| 10,222,891 B1* | 3/2019 | Smith | | G06F 3/0416 |
| 10,222,892 B1* | 3/2019 | Smith | | G06F 3/0416 |
| 10,222,893 B1* | 3/2019 | Smith | | G06F 3/0416 |
| 10,222,894 B1* | 3/2019 | Smith | | G06F 3/0416 |
| 10,222,895 B1* | 3/2019 | Smith | | G06F 3/0416 |
| 2006/0022955 A1* | 2/2006 | Kennedy | | G06F 3/0414 345/173 |
| 2010/0039393 A1* | 2/2010 | Pratt | | G06F 3/0236 345/173 |
| 2010/0107099 A1* | 4/2010 | Frazier | | G06F 3/044 715/765 |
| 2011/0193788 A1* | 8/2011 | King | | G06F 3/017 345/173 |
| 2011/0197156 A1 | 8/2011 | Strait et al. | | |
| 2012/0274662 A1* | 11/2012 | Kim | | G06F 3/0488 345/650 |
| 2012/0293450 A1 | 11/2012 | Deitz et al. | | |
| 2013/0113715 A1* | 5/2013 | Grant | | G06F 3/0488 345/173 |
| 2013/0120302 A1* | 5/2013 | Kang | | G06F 3/041 345/173 |
| 2013/0311938 A1* | 11/2013 | Frazier | | G06F 3/044 715/781 |
| 2014/0215308 A1* | 7/2014 | Cantrell | | G06F 16/9577 715/234 |
| 2014/0215398 A1 | 7/2014 | Fleizach et al. | | |
| 2014/0232573 A1* | 8/2014 | Aull | | G06F 3/0219 341/22 |
| 2014/0351726 A1* | 11/2014 | King | | G06F 3/017 715/765 |
| 2015/0268725 A1* | 9/2015 | Levesque | | G06F 3/016 345/156 |
| 2015/0268766 A1* | 9/2015 | Kim | | G06F 3/044 345/174 |
| 2015/0268780 A1* | 9/2015 | Kim | | G06F 3/0412 345/174 |
| 2016/0098184 A1* | 4/2016 | Kim | | G06F 3/0488 715/786 |
| 2016/0103655 A1* | 4/2016 | Klein | | G06F 3/167 704/275 |
| 2016/0188181 A1* | 6/2016 | Smith | | G06F 3/0416 715/765 |
| 2016/0357281 A1* | 12/2016 | Fleizach | | H04N 3/155 |
| 2017/0010781 A1* | 1/2017 | Bostick | | G06F 17/211 |
| 2017/0075563 A1* | 3/2017 | Bauer | | H04M 1/72522 |
| 2017/0090725 A1* | 3/2017 | Jansky | | G06F 3/04842 |
| 2017/0131776 A1* | 5/2017 | Grant | | G06F 3/044 |
| 2017/0228066 A1* | 8/2017 | Chiang | | G06F 3/044 |
| 2018/0113672 A1* | 4/2018 | Klein | | G06F 3/0414 |
| 2018/0121000 A1* | 5/2018 | Klein | | G06F 3/0414 |
| 2018/0284892 A1* | 10/2018 | Kwon | | G06F 3/04883 |
| 2018/0314418 A1* | 11/2018 | Bostick | | G06F 17/211 |
| 2018/0356965 A1* | 12/2018 | Hagiwara | | G06F 3/04845 |
| 2019/0018532 A1* | 1/2019 | Klein | | G02F 1/13338 |
| 2019/0026072 A1* | 1/2019 | Miron | | G06F 3/167 |

OTHER PUBLICATIONS

"International Search Report and Written Opinion issued in PCT Application No. PCT/US2018/034802", dated Aug. 24, 2018, 11 Pages.

Tanasychuk, Mike, "How to use VoiceOver on iPhone and iPad: iMore", Retrieved from: https://www.imore.com/how-use-voiceover-iphone-and-ipad, Sep. 15, 2016, 34 Pages.

Findlater, et al., "Enhanced Area Cursors: Reducing Fine Pointing Demands for People with Motor Impairments," in Proceedings of the 23nd Annual ACM Symposium on User Interface Software and Technology, Oct. 2010, 10 pages.

Mott, et al., "Smart Touch: Improving Touch Accuracy for People with Motor Impairments with Template Matching," in Proceedings of the CHI Conference on Human Factors in Computing Systems, May 2016, 13 pages.

Gajos, et al., "Automatically Generating User Interfaces Adapted to Users' Motor and Vision Capabilities," in Proceedings of the 20th Annual ACM Symposium on User interface Software and Technology, Oct. 2007, 10 pages.

Montague, et al., "Motor-Impaired Touchscreen Interactions in the Wild," in Proceedings of the 16th International ACM SIGACCESS Conference on Computers & Accessibility, Oct. 2014, 8 pages.

Surdilovic, et al., "Convenient intelligent cursor control web systems for Internet users with severe motor-impairments," available at <<http://www.sciencedirect.com/science/article/pii/S1386505605001504>>, in International Journal of Medical Informatics, vol. 75, Issue 1, Jan. 2006, abstract only, 3 pages.

Fang, et al., "From Captions to Visual Concepts and Back," in arXiv:1411.4952v3 [cs.CV], Apr. 14, 2015, 10 pages.

"Force-Touch," available at <<https://en.wikipedia.org/wiki/Force_Touch>>, Wikipedia entry, accessed on Jul. 13, 2017, 3 pages.

\* cited by examiner

← 2002

```
RECEIVE INPUT SIGNALS FROM AN INPUT DEVICE OF A COMPUTING DEVICE. THE INPUT
SIGNALS INCLUDE AT LEAST ONE SIGNAL COMPONENT THAT REFLECTS A DEGREE OF
FORCE AT WHICH A USER PRESSES AGAINST A SURFACE OF THE INPUT DEVICE.
2004
```

↓

```
DETERMINE, BASED ON THE INPUT SIGNALS, WHETHER THE USER HAS PERFORMED A
FORCE-DEPENDENT ACTUATION IN WHICH THE USER PRESSES THE SURFACE OF THE
INPUT DEVICE WITH A PRESCRIBED FORCE-DEPENDENT SIGNAL PROFILE
2006
```

↓

```
ACTIVATE A PRESCRIBED CONTROL MODE IN RESPONSE TO DETERMINING THAT THE
USER HAS PERFORMED THE FORCE-DEPENDENT ACTUATION
2008
```

↓

```
PROVIDE AN ASSISTED TECHNOLOGY USER INTERFACE EXPERIENCE IN RESPONSE TO
THE CONTROL MODE THAT HAS BEEN ACTIVATED. THE ASSISTED TECHNOLOGY USER
INTERFACE EXPERIENCE CORRESPONDS TO AN EXPERIENCE THAT IS CONFIGURED TO
ASSIST USERS WITH VISUAL AND/OR MOTOR IMPAIRMENTS IN INTERACTING WITH A USER
INTERFACE PRESENTATION OF THE COMPUTING DEVICE
2010
```

FIG. 20

FACILITATING INTERACTION WITH A COMPUTING DEVICE BASED ON FORCE OF TOUCH

BACKGROUND

A user may have a disability which introduces challenges in his or her interaction with touch-sensitive input devices. For example, the user's hands may shake in an incontrollable manner. This makes it difficult for the user to perform conventional operations using touch-sensitive input devices, such as drag-and-drop. For instance, in the course of dragging an object, the user may inadvertently lift his or her hands from a touch-sensitive surface of an input device. That event will prematurely terminate the drag-and-drop operation, requiring the user to reselect the object and begin again. In another case, a user may have a vision impairment which prevents the user from visually discerning the details of a user interface presentation. This makes it difficult for the user to interact with small control features of the user interface presentation.

In other situations, a user may have no permanent disabilities, yet may nevertheless encounter a situation in which there is some obstacle which impedes the user's interaction with a touch-sensitive input device. Here, the user may be said to experience situational disabilities.

SUMMARY

A technique is described herein that allows a user to control a user interface presentation provided by a computing device based on the force-dependent manner in which the user engages a force-sensitive input device. This manner of control allows any user to efficiently interact with the computing device, but is particularly beneficial to users who have motor-related and/or vision-related disabilities.

According to one implementation, the technique involves: receiving input signals from an input device, the input signals including at least one signal component that reflects a degree of force at which a user presses against a surface of the input device; determining, based on the input signals, whether the user has performed a force-dependent actuation in which the user presses the surface of the input device with a prescribed force-dependent signal profile; activating an assistive technology (AT) control mode in response to determining that the user has performed the force-dependent actuation; and providing an assistive technology user interface experience in response to the control mode that has been activated. That assistive technology user interface experience corresponds to any kind experience that is configured to assist users with visual and/or motor impairments in interacting with the computing device.

For instance, in some cases, the input signals describe a touch intensity value within a range of possible touch intensity values. The technique can use the received touch intensity value to control any of: (a) a magnification level of a portion of the user interface presentation; (b) a level of clarity at which information is presented on the user interface presentation; (c) a rate at which information is delivered to the user; (d) a scope of information that is delivered to the user; (e) a degree of damping applied to movement of a graphical object on the user interface presentation, etc. To cite one illustrative scenario of this manner of operation, a user with a vision-related impairment may press down on the surface of the input device to progressively increase the readability of the information presented by a user interface presentation, e.g., by increasing its magnification and/or clarity.

In other cases, the technique can use a force-dependent actuation to: (a) initiate a context-based voice recognition operation; (b) initiate a drag-and-drop operation; (c) initiate a selection operation; (d) activate an axis-locked cursor movement operation, etc. In some cases, the user performs a follow-up force-dependent actuation to indicate that a desired operation has been completed. To cite one illustrative scenario of this manner of operation, a user with a motor-related impairment may activate a drag-and-drop control mode by pressing down on a graphical object with a requisite degree of force. The user may subsequently drag the object to a destination location, followed by making another prescribed force-dependent actuation at the destination location. The computing device maintains the drag-and-drop control mode throughout the dragging operation, even when the user inadvertently lifts his or her hand from the surface of the input device.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 20 shows a process that corresponds to one manner of operation of the computing device of FIG. 1.

Figure 1:
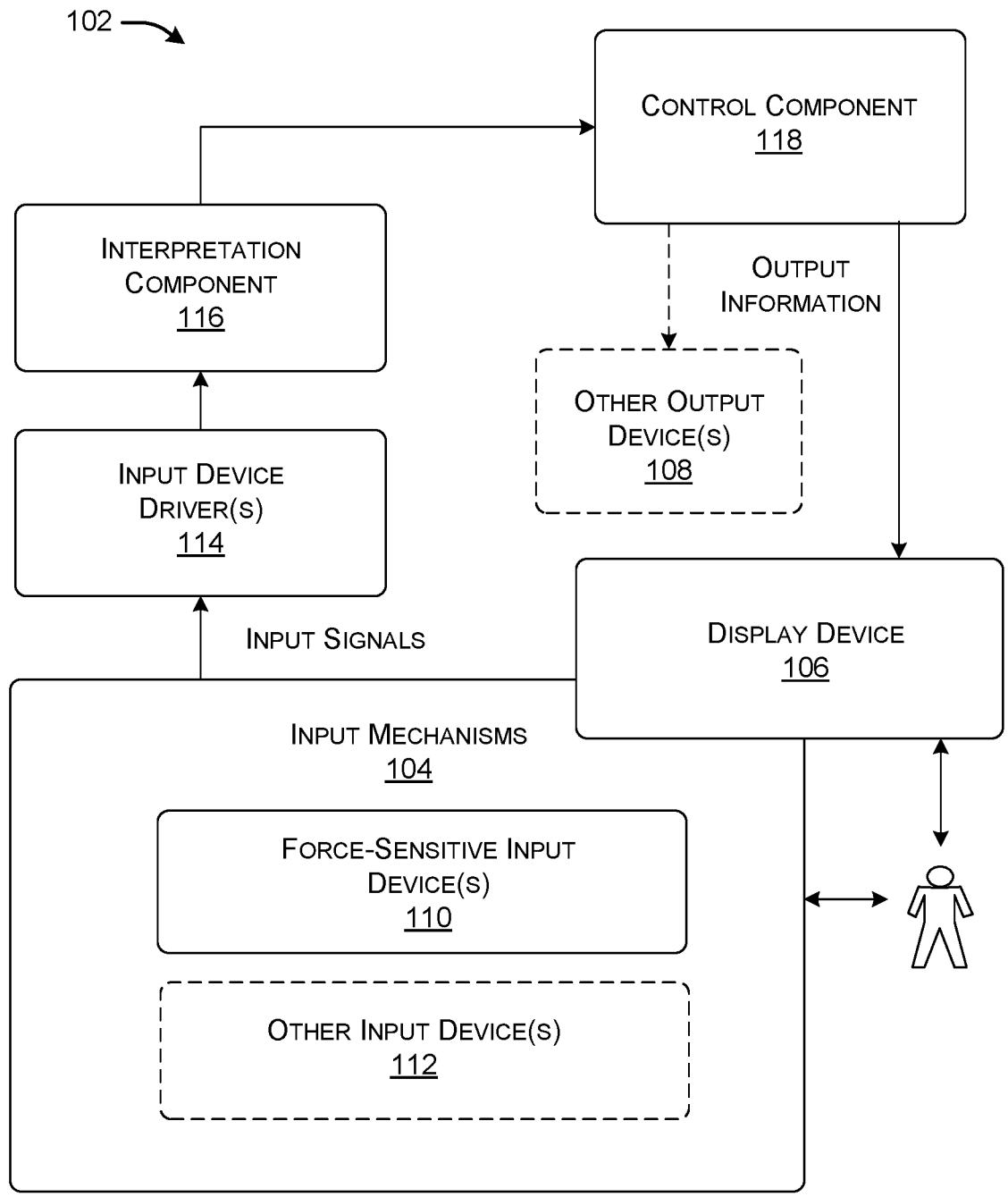
FIG. 1 shows an overview of a computing device which processes input signals from an input device. The input signals include at least one signal component that measures a degree of force at which a user presses against a surface of the input device.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computing device for assisting a user in interacting with a computing device, based on a level of force with which the user interacts with a touch-sensitive surface of an input device. Section B sets forth illustrative methods which explain the operation of the computing device of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. In one implementation, the various processing-related components shown in the figures can be implemented by software running on computer equipment, or other logic hardware (e.g., FPGAs), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that perform processing-related functions can be implemented by software running on computer equipment, or other logic hardware (e.g., FPGAs), etc., or any combination thereof.

As to terminology, the phrase "configured to" encompasses various physical and tangible mechanisms for performing an identified operation. The processing-related mechanisms can be configured to perform an operation using, for instance, software running on computer equipment, or other logic hardware (e.g., FPGAs), etc., or any combination thereof.

The term "logic" encompasses various physical and tangible mechanisms for performing a task. For instance, each operation illustrated in the flowcharts that performs a processing-related function corresponds to a logic component for performing that operation. Such an operation can be performed using, for instance, software running on computer equipment, or other logic hardware (e.g., FPGAs), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows an overview of a computing device 102 which processes input signals that originate from input mechanisms 104, and which provides output information for presentation on a display device 106 and/or some other output device(s) 108 (such as a speaker for presenting audible information). FIG. 1 particularly illustrates the case in which the computing device 102 includes a single display device 106. However, in other cases, the computing device 102 can supply output information to two or more display devices.

The input mechanisms 104 include one or more force-sensitive input devices 110 and other optional input devices 112. A force-sensitive input device measures an amount of force that the user applies to a touch-sensitive surface of the force-sensitive input device at each of one or more touch locations. As a complementary function, the force-sensitive input device can also identify each location at which the user makes contact with the surface of the input device. To facilitate explanation, however, many of the examples below will involve the application of a single touch contact associated with a single touch intensity value; any such example can be extended to a multi-touch scenario.

A force-sensitive input device can use any technology to determine a force at which the user presses its surface. For example, the force-sensitive input device can include an array of force sensors that span the surface of the force-sensitive input device. Alternatively, or in addition, the force-sensitive input device can include an array of force sensors arranged around the perimeter of the touch-sensitive surface. These sensors can include, for example, piezo-resistive force sensors, other kinds of resistance-based force sensors, capacitive force sensors, optical force sensors, acoustic-based sensors, etc.

More specifically, in some examples, the sensors measure the change in resistance (or some other measurable property) that occurs when the user actuates particular cells of the input device (e.g., as described in U.S. Patent Application No. 20120293450 to Paul Deitz, et al., published on Nov. 22, 2012). In other examples, the array of sensors can measure the physical displacement of the surface with respect to a reference plane or point. In other examples, the array of sensors (such as capacitive sensors) can detect the area of a point of contact that is produced when the user touches the surface; that area serves as a proxy for the force that the user is applying to the surface, and so on.

In some implementations, a force-sensitive input device can use the same sensor framework to detect both the force at which the user presses the surface of the input device and the location at which the user presses the surface of the input device. In other cases, a force-sensitive input device can use a first sensor framework to measure the force at which the user presses the surface of the input device, and a second sensor framework to measure the location at which the user presses the surface of the input device. In the latter case, any technology can be used to measure the location at which the user presses the surface of the input device, such as capacitive, resistive, optical, acoustic, etc. technology.

In one implementation, at least one force-sensitive input device is integrated with the display device 106. FIG. 1 represents this implementation by showing that the input mechanisms 104 at least partially overlap the display device 106. For example, the computing device 102 can include a touch-sensitive input screen. That touch-sensitive input screen can detect the (x, y) location at which the user touches the surface of the input screen. The touch-sensitive input screen can also detect the amount of force f that the user applies to the input screen while touching it.

Alternatively, or in addition, at least one input device is separate from the display device 106. For example, the computing device 102 can include a touch-sensitive track-pad that is separate from the display device 106. The trackpad registers the location at which the user makes contact with the surface of the trackpad. The trackpad also detects the amount of force that the user applies to the surface of the trackpad.

To facilitate and simplify explanation, the drawings predominately illustrate the case in which the force-sensitive input device corresponds to a touch-sensitive input screen. Note, however, that any example framed in the context of a touch-sensitive input screen can be instead performed using a trackpad in conjunction with a display device.

In still other implementations, a force-sensitive input device can correspond to a pressure-sensitive pen. The pen can include a displacement sensor which measures a displacement of a spring-loaded tip, to provide displacement information. A communication component can send the displacement information from the displacement sensor to the processing components of the computing device 102. The displacement information relates to an amount of force at which the user applies the pen tip to a writing surface. The writing surface may correspond to a touch-sensitive display screen or a separate trackpad.

In still other cases, a force-sensitive input device can correspond to a key input device that registers the force at which the user presses its physical individual key(s).

The other input devices 112 can includes any of: key input devices (which do not measure the force of actuation), conventional touch-sensitive input screens (which do not measure the force of actuation), movement detection devices (e.g., one or more accelerometers, one or more gyroscopes, one or more magnetometers, etc.), voice recognition input mechanisms, video cameras, a depth camera system, etc.

One or more input device drivers 114 receive raw input signals from the input mechanisms 104. An interpretation component 116 determines an input action that the user has performed, or is in the process of performing, based on the input signals. The interpretation component 116 can perform its analysis in one or more levels of analysis, with each level generating analysis results based on the outcome of processing performed by a lower level. A control component 118 generates output information based on an interpretation provided by the interpretation component 116. The control component 118 presents the output information on the display device 106 and/or any other output device(s) 108.

More specifically, the interpretation component 116 determines, based on the input signals provided by the input drivers 114, whether the user has performed a force-dependent actuation in which the user presses the surface of a force-sensitive input device with a prescribed force-dependent signal profile. If so, the control component 118 activates an assistive technology (AT) control mode. The control component 118 then provides an assistive technology user interface experience in response to the control mode that has been activated. That assistive technology user interface experience refers herein to any kind of experience that is configured to assist users with visual and/or motor impairments in interacting with the computing device 102. Assistive technology, in general, refers to any mechanism that is designed for use by people with one or more disabilities. For example, the Technology Related Assistance to Individuals with Disabilities Act of 1988 defines an assistive technology device as "any item, piece of equipment, or product system, whether acquired commercially off the shelf, modified, or customized, that is used to increase, maintain, or improve functional capabilities of individuals with disabilities."

Subsection A.2 below describes several control modes that provide an assistive technology user interface experience that dynamically varies based on a detected touch intensity value, with respect to a range of more than two possible values. Subsection A.3 describes additional control modes that do not necessarily depend on the detection of a variable touch intensity value.

In some implementations, the input device drivers 114, the interpretation component 116, and the control component 118 correspond to elements of an operating system of the computing device 102. In other implementations, one or more applications can implement parts of the interpretation component 116 and/or the control component 118.

Figure 2:
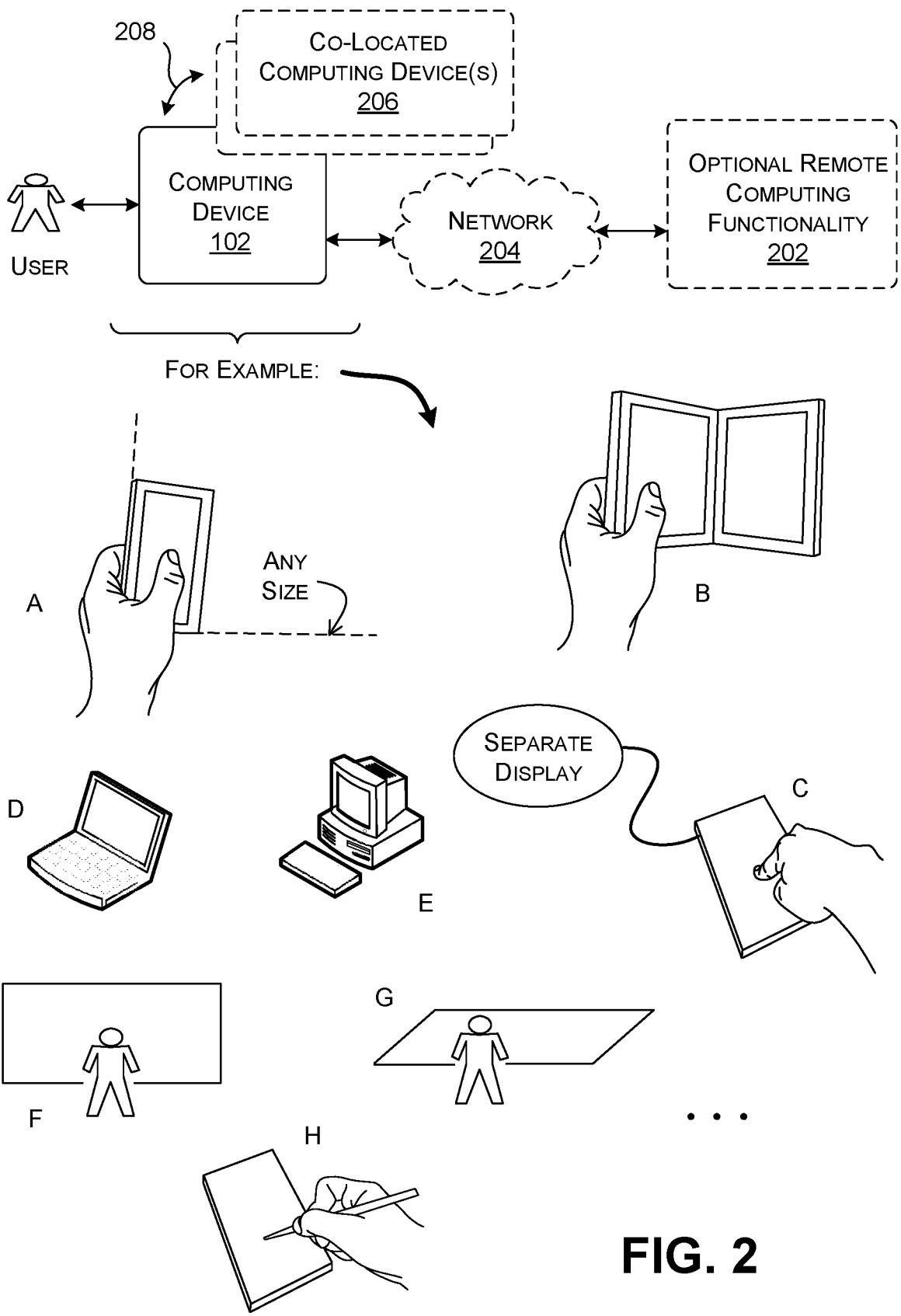
FIG. 2 shows different illustrative manifestations of the computing device of FIG. 1.

FIG. 2 shows different illustrative manifestations of the computing device 102 of FIG. 1. As illustrated, the computing device 102 can correspond to: a handheld computing device of any size and type (as shown in Examples A and B); a laptop-type computing device (as shown in Example C); a desktop computing device (as in Example D); a trackpad (as in Example E); a wall display system (as in Example F); a tabletop display system (as in Example G); a pen input system (as in Example H), and so on.

In some implementations, the computing device 102 operates in standalone fashion. In other implementations, the computing device 102 interacts with optional remote computing functionality 202 via a computer network 204. The remote computing functionality 202 can correspond to one or more remote computer servers and/or one or more remote user computing devices. The computer network 204 can correspond to a local area network, a wide area network (e.g., the Internet), one or more point-to-point links, etc.

In some implementations, the computing device 102 may interact with one or more other co-located computing devices 206 via a communication conduit 208. For example, the co-located computing devices 206 can include other user computing devices associated with the same user who controls the computing device 102 (and optionally associated with a same user account). Alternatively, or in addition, at least one co-located computing device can include other user computing devices controlled by other users. The communication conduit 208 can include any type of a local area network, a Near Field Communication (NFC) interaction mechanism, etc.

A.2. Controlling an AT Experience Based on a Variable Degree of Force

Figure 3:
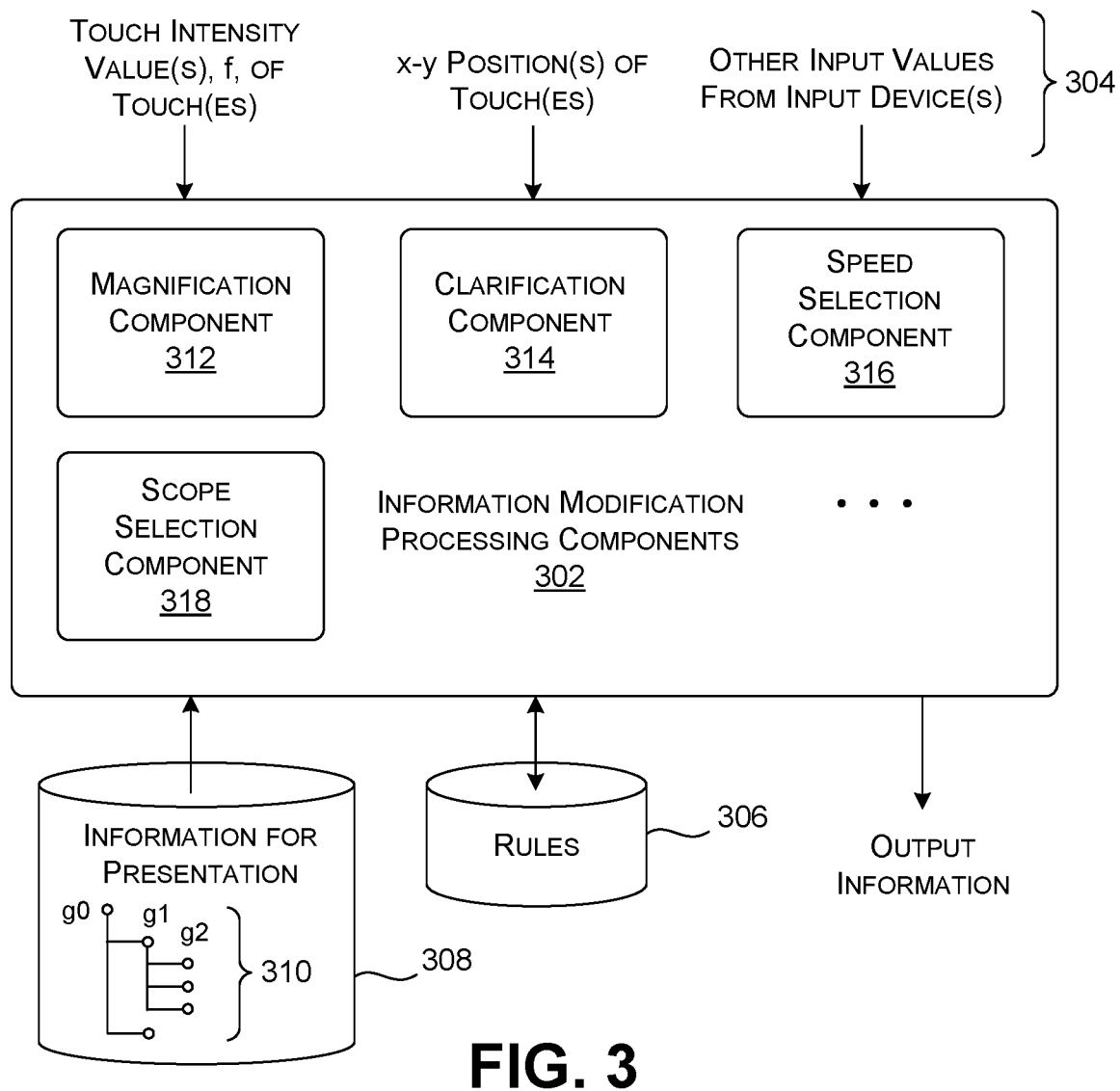
FIG. 3 shows a subset of processing components for use in the computing device of FIG. 1. The processing components process input signals from the input device.

FIG. 3 shows a subset of processing components 302 for use in the computing device 102 of FIG. 1. In general, each processing component performs a different respective task based, in part, on input signals 304 supplied by the input device(s). Each processing component incorporates logic for interpreting the input signals supplied by an input device, to provide an interpretation, and logic for controlling the display device 106 and/or the other output device(s) 108 based on the interpretation. In other words, each processing component may be conceptualized as incorporating a task-specific portion of the logic associated with the interpretation component 116 and the control component 118 of FIG. 1.

The input signals 304 can originate from one or more force-sensitive input devices of the type(s) described in FIGS. 1 and 2. In addition, some input signals can originate from other types of input devices, such as conventional key input devices, camera devices, movement detection devices, etc. In general, the input signals can include at least one signal component that describes the force at which the user actuates the surface of a force-sensitive input device at a current time with respect to at least one touch contact. The input signals can also include a signal component that measures an (x, y) position at which the user is touching the surface of an input device with respect to at least one touch contact.

The subset of processing components 302 can operate based on a data store 306 of rules. The rules govern how each processing component interprets the input signals fed to it by one or more input devices. The rules also govern how each processing component modifies an output state of a user interface presentation based on the processing component's interpretation of the input signals. The logic of a rule can be structured in any manner, such as a discrete IF-THEN type construction, an equation or equations, an algorithm, a machine-learned model, etc.

As will be clarified below, some rules operate in a context-specific manner. For instance, some rules incorporate logic that identifies the circumstance(s) in which they are to be invoked. For example, some rules can invoke their behavior based on one or more of: a preference specified the user; a predetermined classification of graphical content with which the user is currently interacting; evidence regarding an extent of the user's current disabilities, and so on. With respect to the last-mentioned factor, the computing device 102 can dynamically assess the assumed disabilities of the user by detecting the user's erratic user interface actions, the user's plural attempts at making a desired user interface selection, the user's explicit activation of an assistive technology mode, and so on. The computing device 102 can selectively invoke its assistive technology services when it receives any such evidence that the user needs assistance. In addition, some rules, once invoked, can execute particular behavior that varies depending on one or more contextual factors (examples of which are provided below).

Each of the processing components 302 generally performs the task of determining whether the user has performed, or is performing, a prescribed force-dependent actuation. If so, the processing component invokes a context-specific control mode. In accordance with the invoked control mode, the processing component maps input information into output information, where the output information defines an output state. The display device 106 and/or some other output device(s) 108 present the output information. For this reason, the processing components 302 may be referred to as "information modification" processing components.

FIG. 3 generally depicts the input information as originating from a data store 308. For instance, the contents of the data store 308 may represent information that is currently being displayed on a user interface presentation, or supplemental information that pertains to information that is displayed on the user interface presentation. As described below, that information may have plural components. The information may further organize its plural components using any type of structure 310, such as a hierarchical structure.

Now referring to the individual processing components themselves, a magnification component 312 provides a magnified view of a portion of a user interface presentation. For instance, the magnification component 312 may present the magnified view in a window that is movable over the user interface presentation, and which magnifies content in the user interface presentation that lies "beneath" the window. In one implementation, the window has a center point defined by a position at which the user touches the surface of the force-sensitive device. This center point also defines the center of the portion of the user interface presentation that is magnified. The magnified view that is presented in the window has a level of magnification that dynamically varies based on the force at which the user presses the surface of the input device, specified by a touch intensity value (f). For instance, the magnification level (m) may be given by the linear equation: $m=c_1*f+c_2$, where $c_1$ and $c_2$ are environment-specific constants. In some implementations, however, the magnification component 312 only applies this variable effect for values of f above a prescribed force threshold value $f_{threshold}$. (Note that this clarification applies to all processing modules described in Subsection A.2.)

A clarification component 314 provides a clarified view of a portion of a user interface presentation. The clarification component 314 may deliver its experience in the same manner as the magnification component 312, e.g., via a window that is movable over the user interface presentation, and which clarifies content in the user interface presentation that lies "beneath" the window. Again, the window has a center point defined by a position at which the user touches the surface of the force-sensitive device. The clarified view presented in the window has a level of clarification that dynamically varies based on the force at which the user presses the surface of the input device. The clarification component 314 differs from the magnification component 312, in part, in that it changes one or more feature-defining characteristics of the graphical elements encompassed by a region selected by the user, instead of, or in addition to, magnifying those graphical elements. In other words, the clarification component 314 affects the composition of those graphical elements, not merely the scale of those elements.

Figure 4:
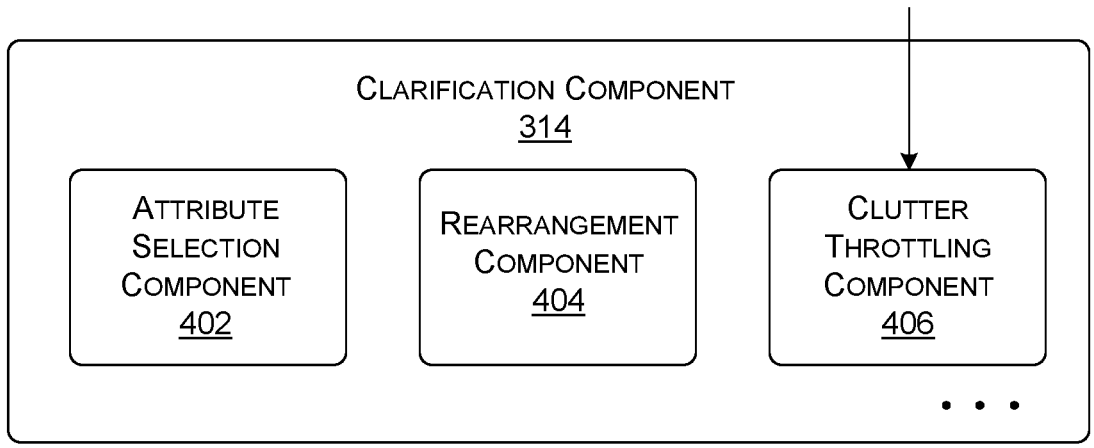
FIG. 4 shows one implementation of a clarification component, which corresponds to one processing component of the subset of processing components shown in FIG. 3.

FIG. 4 shows one implementation of a clarification component 314. As indicated, the clarification component 314 can include two or more subcomponents which operate separately or in combination. An attribute selection component 402 modifies one or more properties of the graphical elements presented in the user interface presentation based on the touch intensity value (f). In one implementation, the attribute selection component 402 may rely on one or more rules that identify a strategy for transforming input graphical content into output graphical content, as a function of the touch intensity value f. In operation, the attribute selection component 402 identifies a set of graphical elements within the region selected by the user, and then consults the rule(s) to determine how to transform these elements into a clarified form, as a function of the touch intensity value f.

For example, the attribute selection component 402 can perform any of: increasing the weight of lines within the user interface presentation; increasing a contrast between different graphical features in the user interface presentation; eliminating graphical content associated with non-essential ornamentation, and so on. The attribute selection component 402 can vary the contrast between two neighboring graphical features by increasing the brightness differential between the features, increasing the color contrast between the features, etc.

With specific regard to alphanumeric content, the attribute selection component 402 can perform any of: changing a font of alphanumeric characters to a prescribed simplified font (e.g., compared to a font with ornamental embellishments); increasing the weight of characters (e.g., by bolding the characters); increasing the size of the alphanumeric characters; increasing a contrast between the alphanumeric characters and a background region, and so on.

A rearrangement component 404 rearranges graphical elements in the user interface presentation based on the touch intensity value f. For example, the rearrangement component 404 can increase a distance between graphical objects based on the touch intensity value f. The rearrangement component 404 can use any strategy for performing this task, such as by arranging the graphical objects within a region-of-interest in rows and columns, and then progressively increasing the distance between neighboring rows and columns, etc. In another case, the rearrangement component 404 can, in a progressive manner, radially extend the graphical objects out from a center point associated with the region-of-interest.

In some implementations, the rearrangement component 404 can modify the graphical elements in a context-specific manner. The relevant context can include, but it not limited to: a number of elements in a region to be modified; the size(s) of the elements to be modified; whether or not the elements are interactive in nature; the existing density of elements in the region, and/or the existing density of elements in areas that neighbor the region, and so on. In some implementations, the rearrangement component 404 operates in this manner by applying one or more context-specific rules. For example, one rule can increase the separation between interactive elements more than it increases the separation between non-interactive elements. Another rule can increase the separation between elements in a manner that is inversely proportional to the sizes of the elements, such that it will move two smaller elements farther apart compared to two larger elements, and so on. Alternatively, in addition, the rearrangement component 404 can apply a collision engine that determines when any change will cause two elements to overlap if one or more of them are moved; in some circumstances, the rearrangement component 404 can refrain from moving elements if doing so would cause them to overlap.

A clutter throttling component 406 reduces an amount of distraction that competes with a user interface presentation (or portion thereof) based on the touch intensity value f. These distractions may originate from received notifications, advertisements, system maintenance events, the dynamic presentation of user interface content (e.g., video, animated graphics, scrolling content, and so on), etc. For example, the clutter throttling component 406 can reduce a volume of received notifications in proportion to the touch intensity value f. In one implementation, the clutter throttling component 406 can perform this task by displaying only the n most important notifications that are received per unit of time, wherein n varies based on f. The clutter throttling component 406 can assess importance of a received notification based on ranking information explicitly associated with the notification and/or based on other filtering rules. In another example, the clutter throttling component 406 can pause animation or video, or slow down the animation or video at a rate that depends on f. The clutter throttling component 402 can perform this operation in a context-sensitive manner based on one or more factors, such as a level of importance that has been associated, in advance, with the dynamic content.

The above examples of the clarification component 314 are cited by way of illustration, not limitation. Other examples can provide yet additional types of mechanisms that serve the intended purpose of increasing the clarity of information presented on the user interface presentation.

Returning to FIG. 3, a speed selection component 316 specifies the speed at which information is delivered to the user in response to the touch intensity value f. For example, the speed selection component 316 can specify the speed at which information is spoken by an automated voice synthesizer narrator and/or the rate at which information is scrolled within the user interface presentation. In one approach, the speed selection component 316 can choose the speed (s) based on a linear equation, e.g., $s=c_3*f+c_4$, where $c_3$ and $c_4$ are environment-specific constants.

A scope selection component 318 chooses the scope at which information is delivered to the user based on the touch intensity value f. For example, consider the case in which a collection of information items is arranged in p hierarchical levels. The scope selection component 318 can deliver information at a particular level in the hierarchy based on the touch intensity value f. For instance, the scope selection component 318 can deliver information at a given level k for a first range of touch intensity values, and deliver information at a next (lower) level k+1 for a second range of touch intensity values, where the second range of touch intensity values are greater than the first range of touch intensity values.

The above examples of information modification processing components 302 are cited by way of illustration, not limitation. Other examples can provide yet additional types of information modification processing components.

In some implementations, the computing device 102 can invoke a rule which applies a single processing component. For example, the computing device 102 can vary only the level of magnification of a portion of the user interface presentation based on the touch intensity value f. In other cases, the computing device 102 can apply a rule which applies two or more processing components in combination, either at the same time or in temporal succession. For example, an illustrative rule may invoke the magnification component 312 to change the level of magnification of information for a first range of touch intensity values. Beyond that range, the rule may invoke the rearrangement component 404 to change the arrangement of graphical objects, so as to increase their mutual separation. Another illustrative rule may simultaneously magnify information and change the arrangement of graphical elements in proportion to the touch intensity value f. In some implementations, the computing device 102 may include a configuration component (not shown) which allows a developer or end-user to create custom rules that govern how the computing device 102 responds to increases in touch intensity value.

Figure 5:
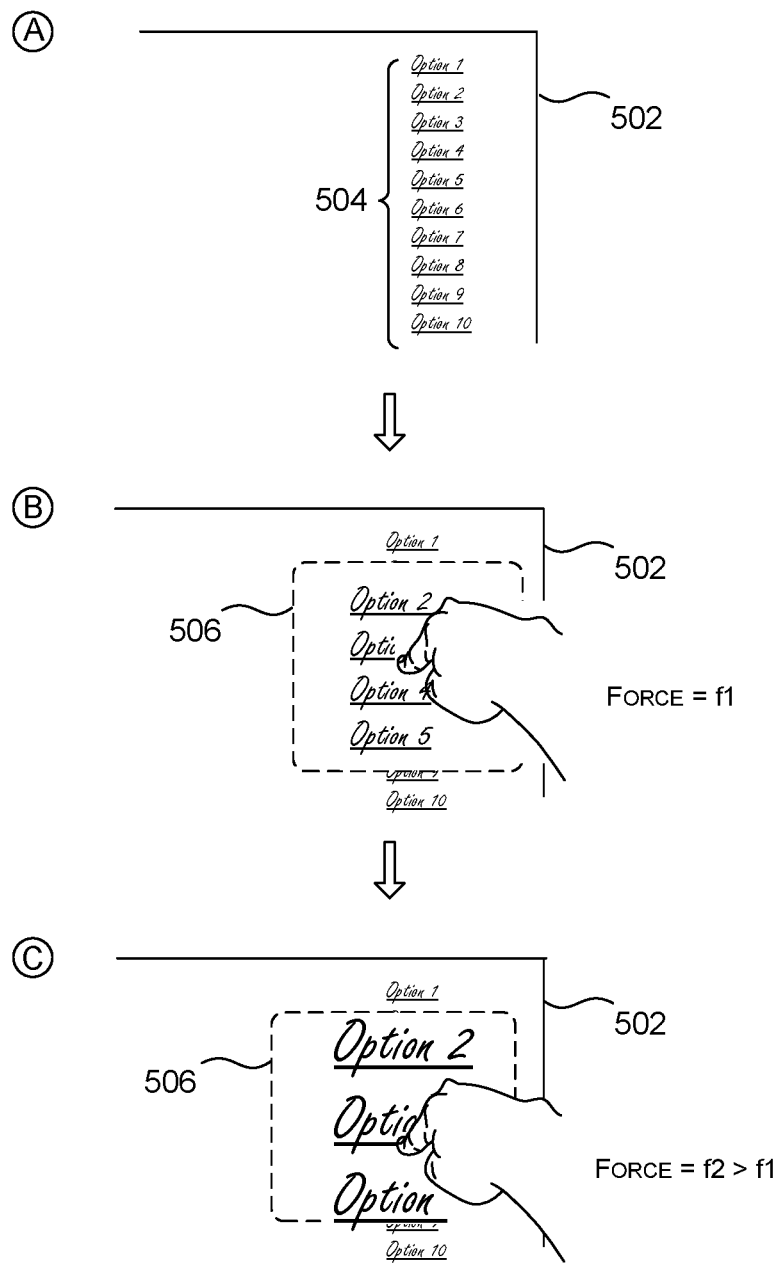
FIG. 5 shows one illustrative manner of operation of a magnification component, which is one of the processing components shown in FIG. 3.

FIG. 5 shows one illustrative manner of operation of a magnification component 312. In state A, the computing device 102 presents a user interface presentation 502 on the display device 106. A portion of the user interface presentation 502 presents a list of links 504 or other types of control elements. Assume in this case that the display device 106 incorporates a touch-sensitive screen having a force-sensitive surface. Hence, the user may interact with the user interface presentation 502 by touching its surface with one or more fingers. Although not shown, the user could alternatively interact with the user interface presentation 502 by manually interacting with a separate trackpad. Note that this comment more generally applies to all of the figures that show a user's interaction with a touch-sensitive screen; that is, any such interaction can alternatively be performed by interacting with a separate trackpad, although not shown.

In state B, the magnification component 312 receives input signals that indicate that: (a) the user has touched a location within the list of links 504; and (b) the user applies an amount of force given by a touch intensity value $f_1$. In response to detecting input signals associated with this state, the magnification component 312 presents a window 506 that presents a magnified view of information in the list of links 504 in proximity to the location at which the user has pressed the list of links 504. The level of magnification is proportional to the touch intensity value $f_1$.

In state C, assume that the user maintains his or her finger at the same location, but now applies an amount of force given by a touch intensity value $f_2$, where $f_2>f_1$. In response to detecting input signals associated with this state, the magnification component 312 appropriately increases the level of magnification within the window 506.

Note that the shape of the window 506 shown in FIG. 5 is generally rectangular, but the window 506 can have any geometric shape (such as circular). The user may move the window 506 by sliding his or her finger across the user interface presentation 502. The window 506 presents a magnified view of information that is centered at the point at which the user makes contact with the surface of the display device 106.

In an alternative implementation, the magnification component 312 can present the magnified view on a window that spans the entire area of the user interface presentation 502. In that case, the center of the window may correspond to the location at which the user touches the user interface presentation 502.

Figure 6:
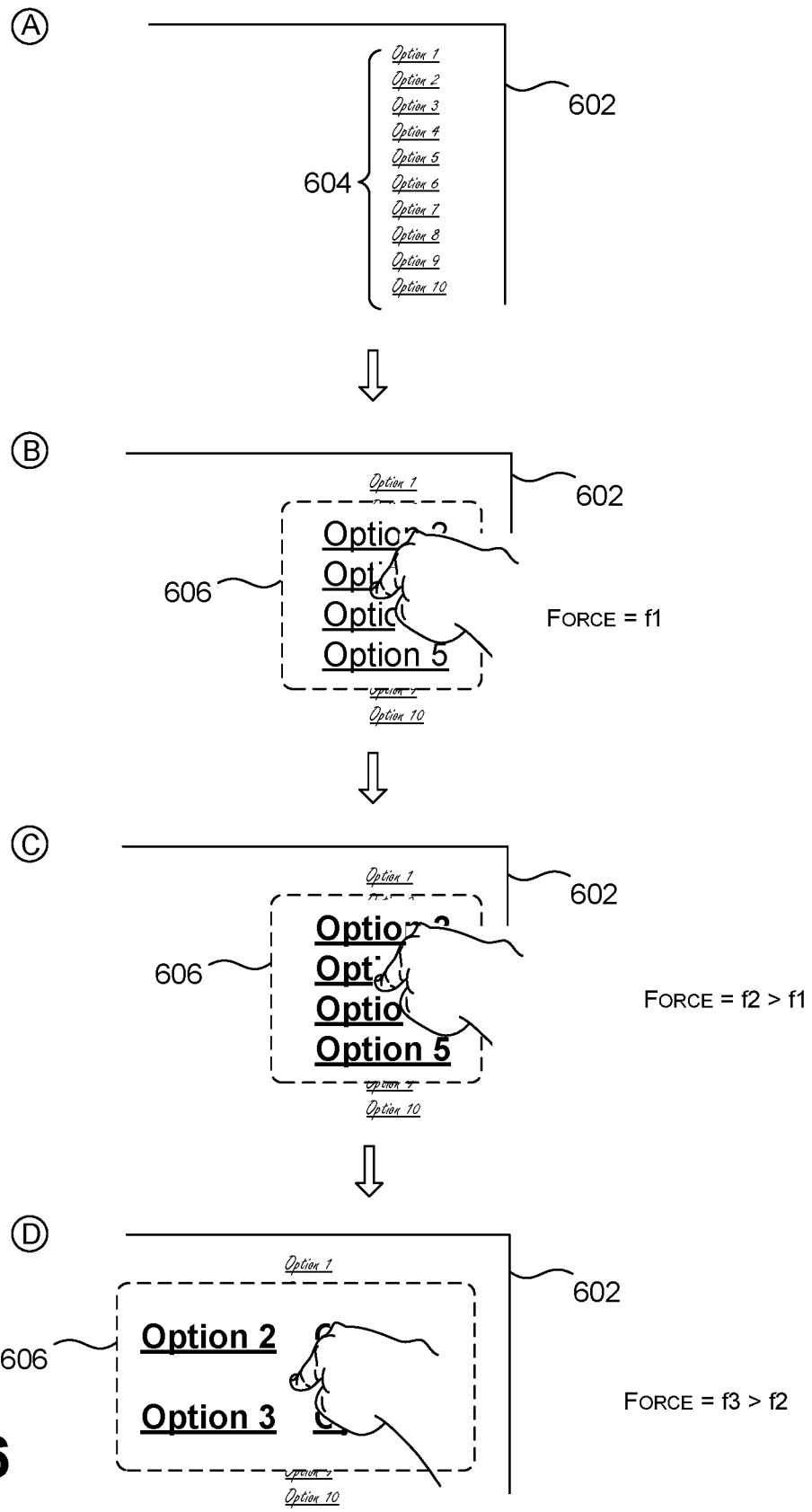
FIG. 6 shows one illustrative manner of operation of the clarification component of FIG. 4.

FIG. 6 shows a variation of the example of FIG. 5. In state A, the computing device 102 again presents a user interface presentation 602 that shows a list of links 604. In state B, the computing device 102 detects that the user has pressed a location within the list of links 604 with a touch intensity value of $f_1$. In response, plural processing components 302 cooperate to generate output information within a window 606. For example, according to one illustrative and non-limiting rule, the magnification component 312 produces a magnified view of information in proximity to the touch location, at a level of magnification that is proportional to the measured touch intensity value $f_1$. At the same time, the attribute selection component 402 changes the typeface of the links in the magnified view by changing the font. That is, the attribute selection component 402 chooses a predetermined font that is more simplified compared to the original font that is used to display the links. This change in font has the effect of clarifying the alphanumeric information conveyed by the links.

At state C, assume that the user continues to press the surface of the display device 106 at the same location associated with the state B, but now with a second touch intensity value $f_2$, where $f_2>f_1$. In response to detecting and interpreting input signals associated with this state, the attribute selection component 402 increases the font weight of the information presented in the window 606. That is, the attribute selection component 402 presents the alphanumeric information in the window 606 in boldface.

At state D, assume that the user continues to press the surface of the display device 106 at the same location associated with the state B, but now with a third touch intensity value $f_3$, where $f_3>f_2$. In response, the rearrangement component 404 rearranges the links shown in state C, e.g., by partitioning a single column of entries into two columns of entries. This has the effect of increasing the distance between any two links.

Figure 7:
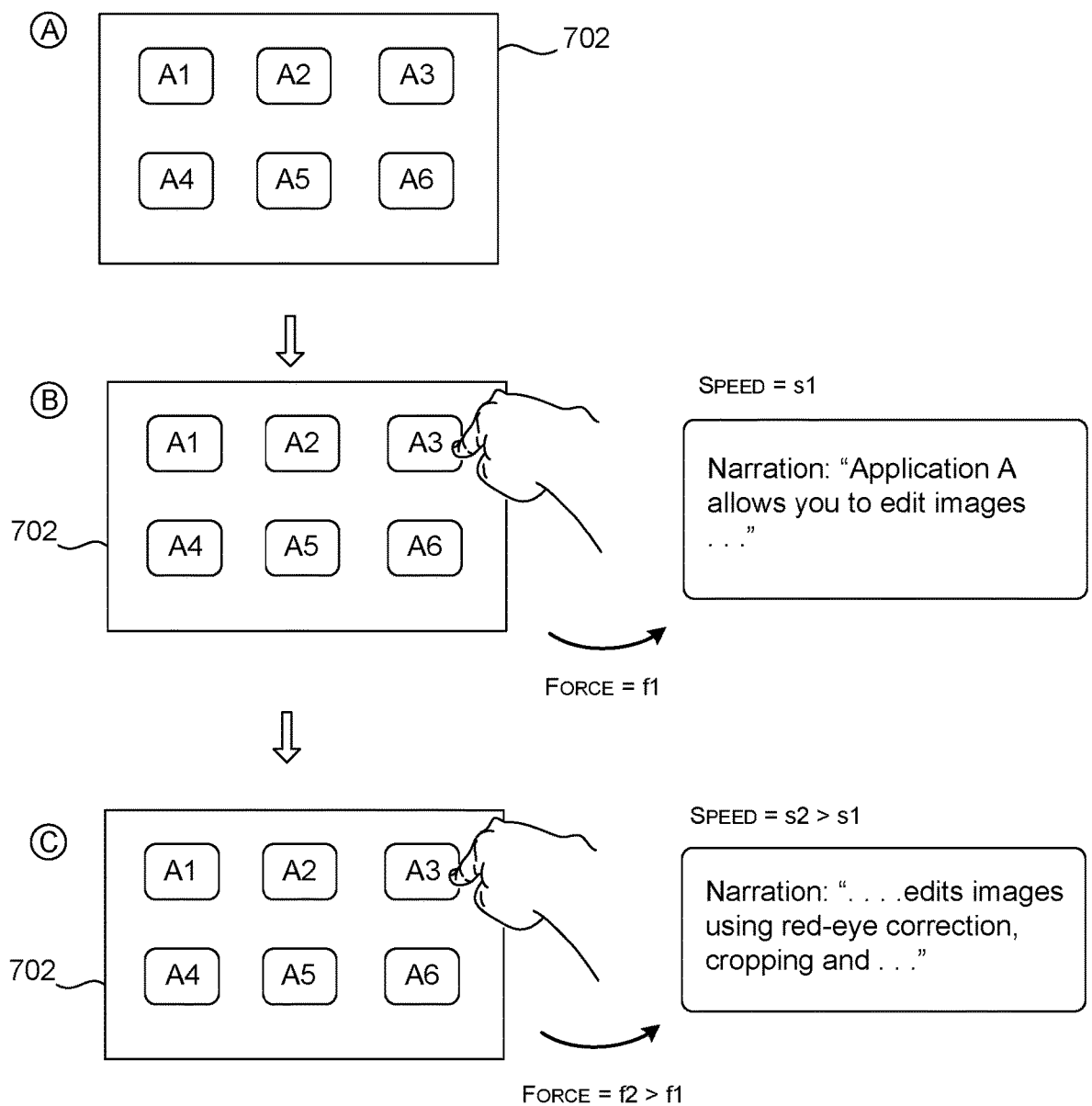
FIG. 7 shows one illustrative manner of operation of a speed selection component, which is another processing component shown in FIG. 3.

FIG. 7 shows one illustrative manner of operation of speed selection component 316. In state A, assume that the computing device 102 displays a set of icons on a user interface presentation 702. Assume that each icon is associated with an application, and that the user may activate an application by performing an appropriate selection gesture directed to a corresponding icon. Further assume that the data store 308 (of FIG. 3) stores predetermined information that describes each application. Finally, assume that the data store 308 arranges the information within the data store 308 in a hierarchy that has plural levels.

In state B, the computing device 102 receives input signals that indicate that the user has touched an icon corresponding to one of the applications with a touch intensity value $f_1$. In response, the speed selection component 516 plays the information associated with the application at a speed $s_1$ that is proportional to $f_1$, e.g., by presenting the information in spoken form via a speaker. In state C, the computing device 102 receives input signals that indicate that user continues to press on one of the icons, but now with a second touch intensity value $f_2$, where $f_2 > f_1$. In response, the speed selection component 516 increases the speed at which the information associated with the application is presented to speed $s_2$, where $s_2 > s_1$.

As a related characteristic, the user can pause the delivery of information by removing his or her finger from the surface of the display device 106. Further, the user can change topics by shifting the position of his or her finger on the user interface presentation 502.

In another case, the speed selection component 516 can perform a rewind operation in response to a predetermined force-dependent signal profile. For example, the user can apply a first force-related gesture to actuate a fast-forward operation and another force-related gesture to actuate a fast-rewind operation, with the degree of advance or rewind being determined by the touch intensity vale f.

Finally, note that the principles shown in FIG. 7 can be extended to any type of graphical object that is annotated with supplemental narrative information. For example, the speed selection component 516 can be applied to windows, menus, files of any type, links and other control features, messages of any type, etc.

Figure 8:
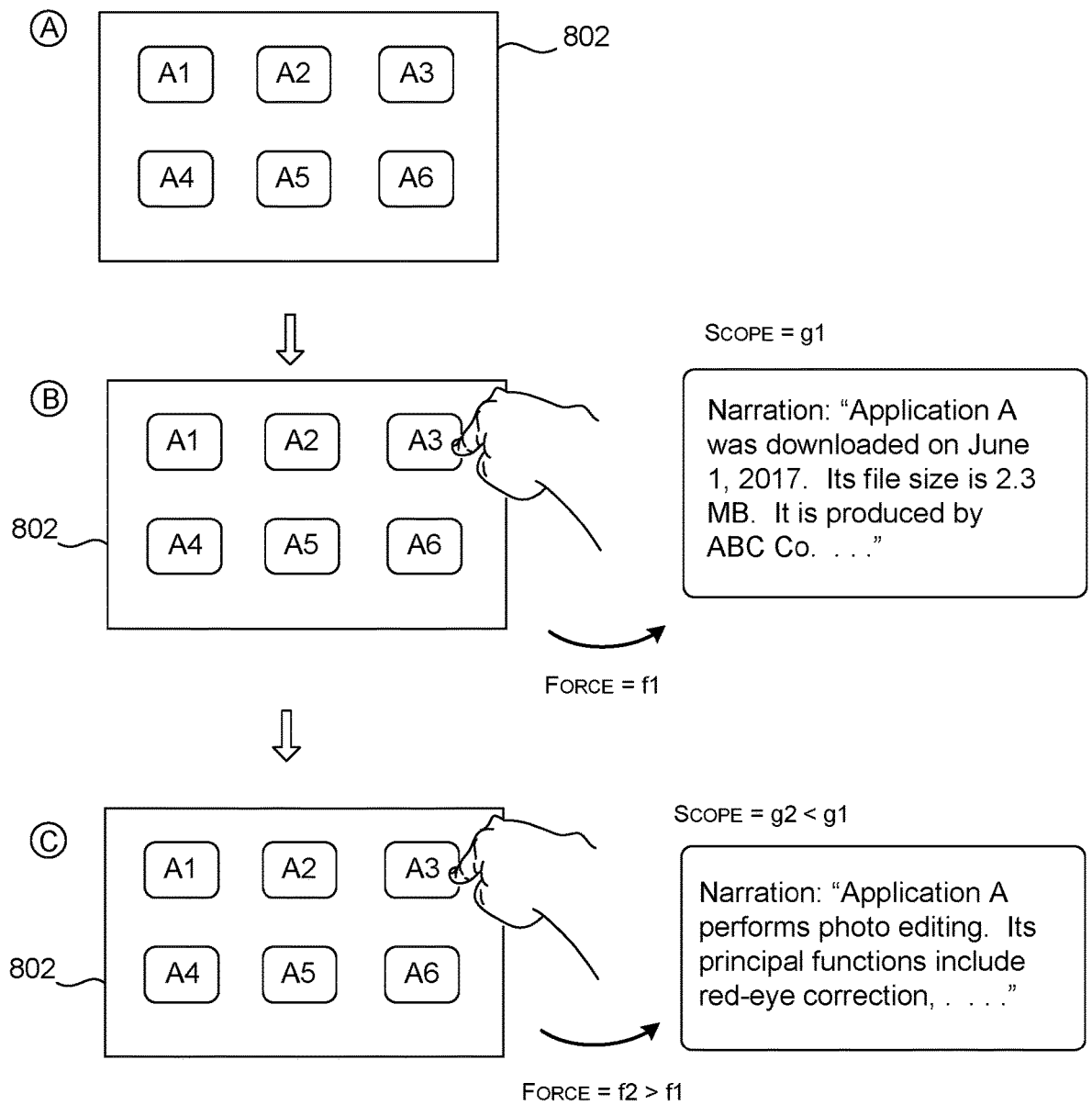
FIG. 8 shows one illustrative manner of operation of a scope selection component, which is another processing component shown in FIG. 3.

FIG. 8 shows one illustrative manner of operation of the scope selection component 318. In state A, assume that a user interface presentation 802 again presents a set of icons associated with respective applications (although, again, the principles set forth herein can be applied to any graphical object). In state B, the computing device 102 receives input signals that indicate that the user has touched an icon corresponding to one of the applications with a touch intensity value $f_1$. In response, the scope selection component 518 plays information having a first scope level $g_1$, where that information is selected based on the value of $f_1$. In state C, the computing device 102 receives input signals that indicate that user continues to press on one of the icons, but now at a second touch intensity value $f_2$, where $f_2 > f_1$. In response, the speed selection component 516 presents information at a second scope level $g_2$, where $g_2 < g_1$. More specifically, in some implementations, the user can receive a progressively more detailed description of the application by pressing increasingly harder on the icon, meaning that a "smaller" scope equates to a greater amount of detail.

Figure 9:
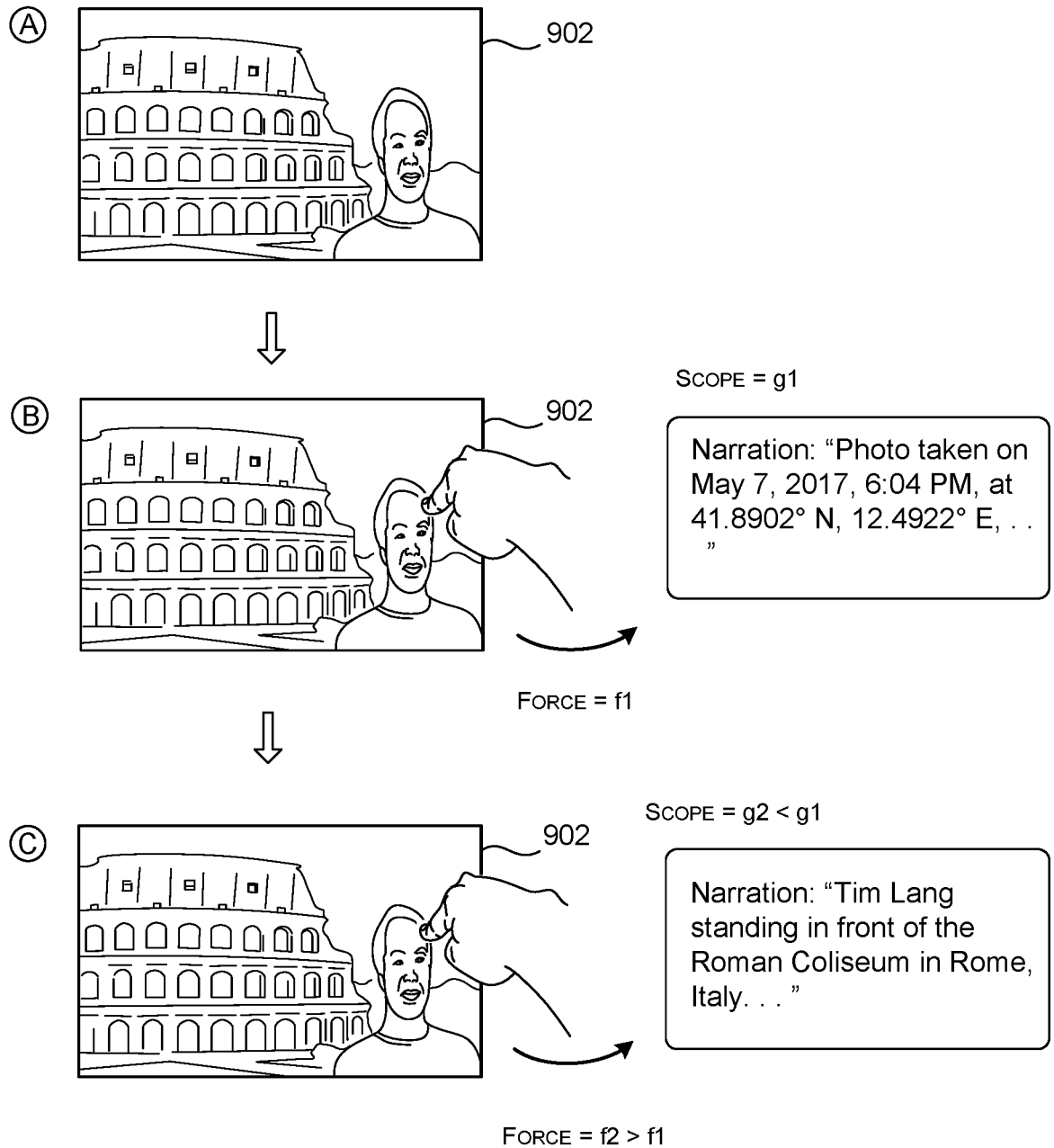
FIG. 9 shows another manner of operation of the scope selection component, in this case, as applied to a digital image.

FIG. 9 shows another manner of operation of the scope selection component 318. In state A, assume that a user interface presentation shows a digital image 902 that depicts a particular person standing in front of the Roman Coliseum in Rome, Italy. Further assume that the data store 308 stores predetermined narrative information that describes the image. Further assume that the data store 308 stores the narrative information in a plurality of hierarchical levels. Alternatively, or in addition, the scope selection component 318 can dynamically generate at least some of the narrative information by performing image analysis on the digital image 902, e.g., using known image captioning technology, e.g., as described in Fang, et al., "From Captions to Visual Concepts and Back," in arXiv:1411.4952v3 [cs.CV], Apr. 14, 2015, pp. 1-10, and/or by applying known face recognition algorithms or models, and known object recognition algorithms or models, etc.

In state B, assume that the user presses a portion of the digital image 902 with a first degree of force, associated with a touch intensity value $f_1$. In response to detecting the resultant input signals, the scope selection component 318 presents information at an appropriate scope level $g_1$, which is selected based on the value of $f_1$. For example, in this state, the user may receive high-level metadata pertaining to the digital image 902. In state C, assume that the user presses the same portion of the digital image 902 with a second touch intensity value $f_2$, where $f_2 > f_1$. In response to detecting the resultant input signals, the scope selection component 318 presents information at a scope level $g_2$, where $g_2 < g_1$. For instance, in this state, the user may receive more detailed information regarding what is depicted in the digital image 902.

In one case, the scope selection component 318 generates a more detailed description that also accentuates a portion of the digital image 902 that the user is touching. In the example of FIG. 9, the user is touching a portion of the digital image 902 corresponding to a face of a person. The scope selection component 318 can generate targeted information in any manner. In one approach, the scope selection component 318 provides predetermined information which maps different objects in the digital image 902 (and their location in the digital image 902) to narrative information. In a runtime phase, the scope selection component 318 determines the part of the digital image 902 that the user is touching, and then retrieves the narrative information associated with that part. Alternatively, or in addition, the scope selection component 318 can dynamically generate narrative information by identifying a portion of the digital image that the user is touching, and then performing the above-described type(s) of automated analysis on the portion (e.g., automated face recognition, automated caption generation, etc.).

Figure 10:
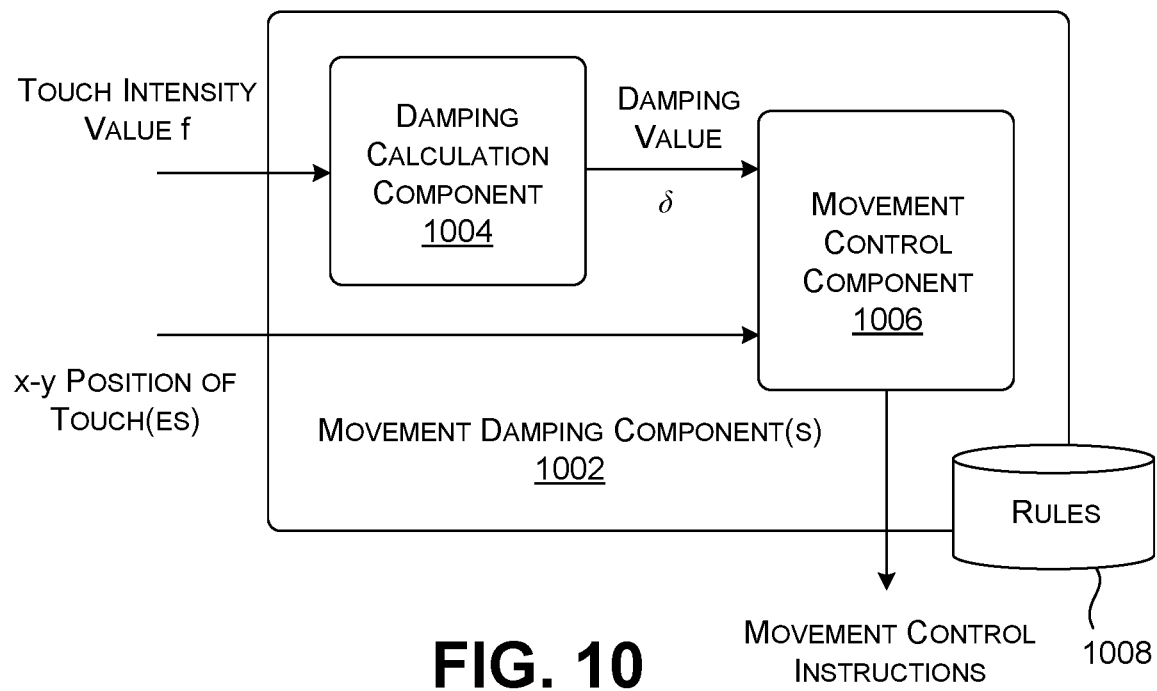
FIG. 10 shows one implementation of a movement damping component, corresponding to another possible processing component that can be used by the computing device of FIG. 1.

FIG. 10 shows one implementation of a movement damping component 1002, corresponding to another possible processing component of the computing device 102 of FIG. 1. This processing component is like the processing components 302 shown in FIG. 3 in that it responds to a variable touch intensity value f, but is unlike the processing components 302 in that it does not leverage the touch intensity value f to translate input information into output information.

More specifically, a damping calculation component 1004 receives a touch intensity value f that measures the force that the user is currently applying to the surface of a force-sensitive input device, such as a force-sensitive display device 106. More specifically, assume that the user applies the force in the process of touching a graphical object of any type on a user interface presentation. The graphical object may correspond to a cursor, window, etc. The damping calculation component 1004 maps this touch intensity value f to a damping value δ, e.g., using a linear equation, an exponential equation, etc.

A movement control component 1006 then applies the damping value δ to govern the manner in which the graphical object (that the user is touching) is moved in relation to movement of the user's touch contact across the surface of the input device. For any damping value δ<1, the movement control component 1006 will dampen the movement of the graphical object to a degree proportional to δ. As an end-result, the user may move the touch contact a distance $d_1$ over the surface of the display device, yet the movement control component 1006 will move the graphical object by a shorter distance $d'_1$, given by $δ*d_1$. This has the effect of retarding the movement of the graphical object (and therefore stabilizing the graphical object) to a degree proportional to the amount of force that the user applies to the input device. The above-described operation describes one type of damping-related behavior among others; a data store 1008 stores one or more rules that define the environment-specific manner of operation of the movement damping component 1002.

In general, insofar as the movement damping component 1002 performs both an interpretation and control function, it can be viewed as incorporating a portion of the interpretation component 116 and control component 118 shown in FIG. 1.

Figure 11:
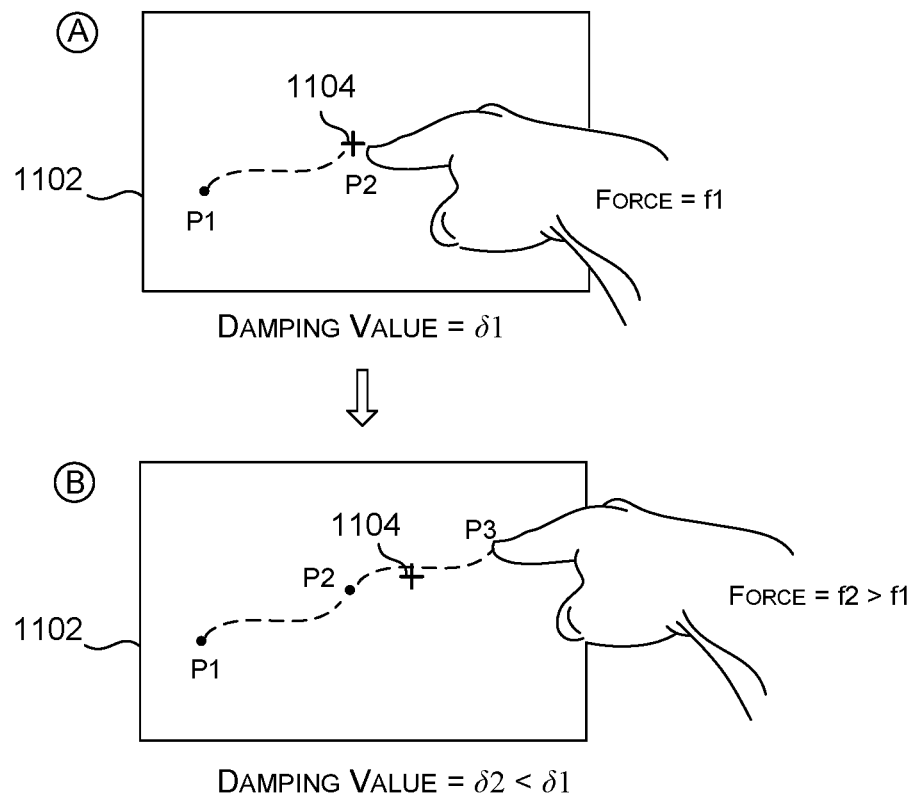
FIG. 11 shows one illustrative manner of operation of the movement damping component of FIG. 10.

FIG. 11 shows one illustrative manner of operation of the movement damping component 1002 of FIG. 10. In state A, assume that the user moves a touch contact from location P1 to location P2 over the surface of a user interface presentation 1102 presented on the force-sensitive display device 106, while applying an amount of force $f_1$ to the surface of the display device 106, where $f_1$ lies within a first range of force values generally associated with a light touch. For this range of force values, the damping value δ is set to 1. As a result, the movement control component 1006 moves a cursor 1104 in a default manner as the user moves his or her touch contact across the display device 106, without applying any assistive-technology-related damping. Different implementations can define such default behavior in different ways; in some cases, for instance, the movement control component 1006 can move the cursor 1104 in a manner that takes into account a speed at which the user moves his or her touch contact across the surface of the display device 106.

In state B, now assume that the user moves the touch contact from location P2 to location P3 over the surface of the user interface presentation 1102, while applying an amount of force $f_2$ to the surface of the display device 106, where $f_2 > f_1$ and where $f_2$ lies within a second range of force values generally associated with a firm touch. For this range of force values, the damping value δ is set to 0.75. As a result, the movement control component 1006 applies damping to the movement of the cursor 1104. At the particular time shown in state B, the cursor 1104 lies some distance behind the point P3 at which the user is currently touching the force-sensitive display device 106. A yet firmer press (not shown) can produce a damping value δ of 0.50, and so on. In addition, the movement control component 1006 can take into account one or more traditional factors in controlling the movement of the cursor 1104, such as the speed at which the user moves his or her touch contact across the surface of the display device 106.

In some implementations, the movement damping component 1002 can be used in tandem with other processing components. For example, the user can perform a characteristic force-dependent gesture to activate both the magnification component 312 and the movement damping component 1002. By increasing the pressure on the input surface the user thereby simultaneously magnifies a view and stabilizes the view. A user with a motor-related disability may enjoy this experience because it reduces the shakiness of the window caused by tremors of the user's hand.

A.3. Additional AT Control Modes

Figure 12:
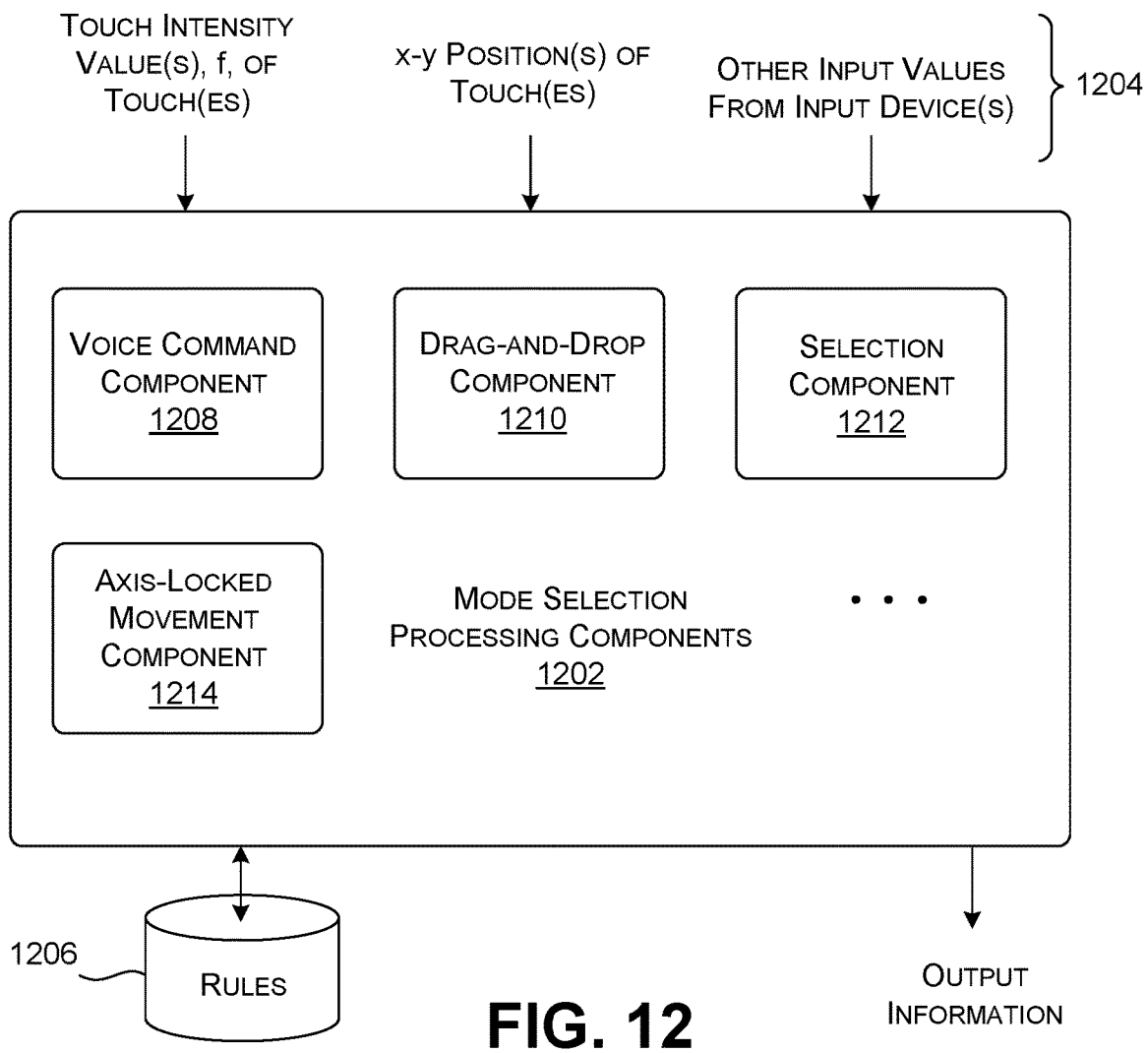
FIG. 12 shows another subset of processing components for use in the computing device of FIG. 1.

FIG. 12 shows another subset of processing components 1202 for use in the computing device 102 of FIG. 1. Like the case of FIG. 3, these processing components 1202 of FIG. 12 process input signals 1204 from a force-sensitive input device and/or other kinds of input devices. In particular, the input signals may convey at least one touch intensity value f at which the user is currently touching the surface of the input device, at least one (x, y) position at which the user is currently touching the surface, and other information. And like the case of FIG. 3, each of the processing components 1202 can be viewed as incorporating a portion of the interpretation component 116 and the control component 118 shown in FIG. 1. Unlike the case of FIG. 3, the processing components 1202 of FIG. 12 do not necessarily involve presenting an assistive technology experience that dynamically varies as a function of a detected touch intensity value within a range of possible values.

In general, each of the processing components 1202 invokes a particular control mode in response to detecting input signals that indicate that the user has engaged the surface of the input device with a predetermined degree of force, or, more generally stated, a predetermined force-dependent signal profile. For example, in one illustrative case, a processing component may determine whether the user has pressed the surface of the force-sensitive input device with a degree of force f above a prescribed threshold value $f_{threshold}$. The processing component thereafter processes contemporaneous and/or subsequent input signals provided by an input device in accordance with the control mode. In some cases, the processing components 1202 terminate the control mode in response to receiving input signals that indicate that the user has again engaged the surface of the input device with a predetermined force-dependent signal profile. A data store 1206 stores rules that govern the operation of the processing components 1202. The rules can express their logic in any manner described above with respect to FIG. 3.

Now referring to individual processing components, a voice command component 1208 determines that the user has pressed the surface of the force-sensitive input device in a manner that satisfies a predetermined force-dependent signal profile, e.g., where the touch intensity value $f > f_{threshold}$. Assume that, in the process of doing so, the user selects a particular graphical object on the user interface presentation. In response, the voice command component 1208 invokes an active listening control mode that sets a scope for use in interpreting voice commands made by the user. For example, assume that the voice command component 1208 determines that the user is currently touching a window hosted by a particular application. In response, the voice command component 1208 interprets the user's command in the context of the functions hosted by the application.

A drag-and-drop component 1210 determines that the user has engaged the surface of the input device with a characteristic force-dependent signal profile, e.g., with $f > f_{threshold}$. Further assume that, in applying this contact, the user selects a particular graphical object on the user interface presentation at a first location. In response, the drag-and-drop component 1210 activates a drag-and-drop control mode. The drag-and-drop component 1210 subsequently moves the graphical object across the user interface presentation in response to corresponding movement by the user of a touch contact on the surface of the input device. In the process, the user can temporarily remove his or her finger from the surface of the input device without aborting the drag-and-drop operation. The drag-and-drop component 1210 determines that the user has terminated the drag-and-drop operation when the user again engages the surface of the input device with a prescribed force-dependent signal profile, and/or when some other mode-terminating event has occurred. In one such other mode-terminating event, the drag-and-drop component 1210 will terminate the drag-and-drop operation if a drop command has not been received within a predetermined amount of time after the start of the drag-and-drop operation.

A selection component 1212 also begins by determining that the user has engaged the user interface presentation by pressing the surface of the input device with a characteristic force-dependent signal profile, e.g., with $f > f_{threshold}$. In response, the selection component 1212 activates a selection control mode. The selection component 1212 subsequently interprets the user's movement of a touch contact across the surface of the input device as an instruction to draw a boundary around a set of graphical objects to be selected on the user interface presentation. In the same manner described above (for the case of the drag-and-drop operation), the user can temporarily remove his or her finger from the surface of the input device without aborting the selection operation. The selection component 1212 determines that the user has terminated the selection operation when the user again engages the surface of the input device with a prescribed force-dependent signal profile, and/or when some other mode-terminating event has occurred (such as the expiration of a time-out period, or an indication that the user has drawn a boundary that defines a closed loop, with respect to any environment-specific degree of spatial tolerance). At this juncture, the selection component 1212 identifies (and thereby selects) whatever graphical components the user has enclosed in the boundary that has been drawn.

An axis-locked movement component 1214 determines that the user is dragging some graphical object (such as a cursor) by applying a prescribed force-dependent actuation to the surface of the input device, e.g., by applying a force having a touch intensity value within a first range of touch intensity values. This operation invokes an axis-locked movement mode. In response, the axis-locked movement component 1214 will move the graphical object in a manner that tracks the movement of the user's touch contact, but wherein the movement of the graphical object is locked to the x axis.

The axis-locked movement component 1214 next determines that the user is dragging the graphical object by applying another prescribed force-dependent actuation to the surface of the input device, e.g., by applying a force having a touch intensity value within a second range of touch intensity values. In response, the axis-locked movement component 1214 will move the graphical object in a manner that tracks the movement of the user's touch contact, but wherein the movement of the graphical object is now locked to the y axis. In other examples, the user can move the graphical object in the y direction prior to moving the graphical object in the x direction. This behavior can also be extended to additional axes. The axes need not be orthogonal.

Figure 13:
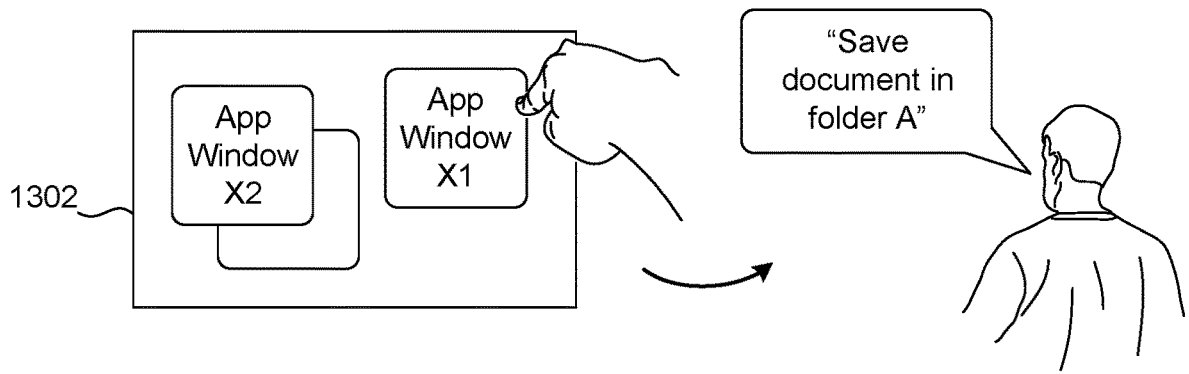
FIG. 13 shows one illustrative manner of operation of a voice command component, which is one of the processing components shown in FIG. 12.

FIG. 13 shows one illustrative manner of operation of the voice command component 1208. In this case, assume that the user has touched a window X1 on a user interface presentation 1302 by applying a predetermined force-dependent signal profile (e.g., with $f > f_{threshold}$) to the surface of the force-sensitive display device 106. In response, the voice command component 1208 interprets the user's subsequent voice command ("Save document in folder A") as pertaining to the operation of whatever application hosts the window X1.

In other cases, the user can select a location on the user interface presentation 1302 that is not associated with any particular graphical object. Here, the voice command component 1208 can activate the active listening mode in a system-wide general context, or in the collective context of all the graphical objects that are active on the user interface presentation 1302, or based on other knowledge of the tasks that the user is currently attempting to perform.

Figure 14:
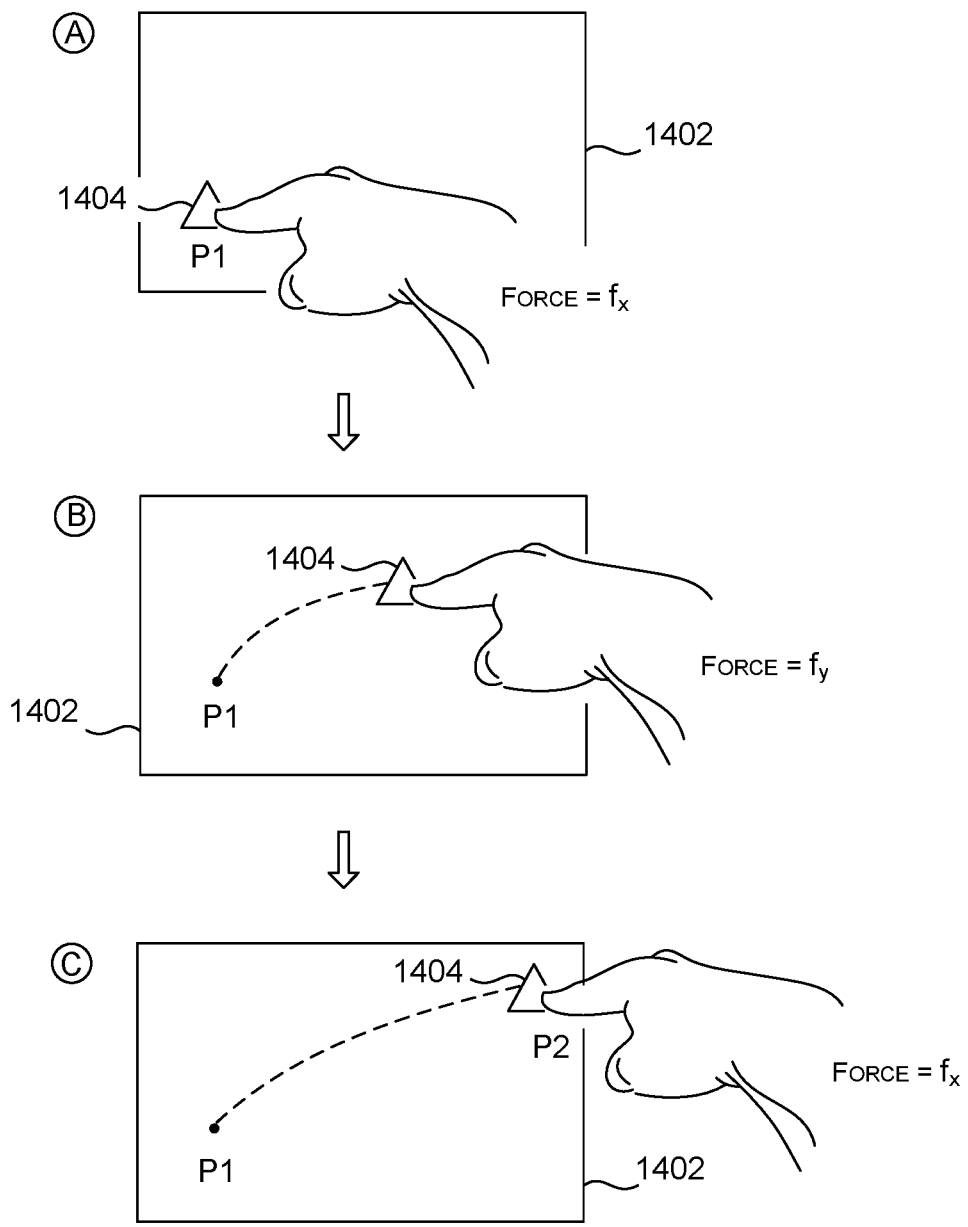
FIG. 14 shows one illustrative manner of operation of a drag-and-drop component, which is another processing component shown in FIG. 12.

FIG. 14 shows one illustrative manner of operation of the drag-and-drop component 1210. In state A, the user presses location P1 on the surface of the force-sensitive display device 106 with a predetermined degree (or profile) of force, e.g., with a degree of force associated with a touch intensity value $f_x$, where $f_x > f_{threshold}$. In performing this action, assume that the user interacts with a user interface presentation 1402 by selecting a graphical object 1404. In response to detecting this operation, the drag-and-drop component 1210 invokes the drag-and-drop control mode.

In state B, the user drags the graphical object 1404 from location P1 on the surface of the display device 106, while applying a second degree (or profile) of force to the surface of the force-sensitive display device 106, e.g., with a degree of force associated with a touch intensity value of $f_y$, where $f_y < f_x$, and where $f_y < f_{threshold}$. In response to detecting this action, the drag-and drop component 1210 drags the graphical object 1404 across the user interface presentation 1402. The drag-and-drop component 1210 can provide any type of feedback that informs the user that the drag-and-drop mode is active during this movement, e.g., by highlighting the graphical object 1404 in a characteristic manner, or by annotating the graphical object 1404 with crosshairs or the like.

In state C, the user presses location P2 on the surface of the display device 106 with a predetermined degree (or profile) of force, e.g., with a degree of force associated with touch intensity value $f_x$. In response to detecting this operation, the drag-and-drop component 1210 terminates the drag-and-drop control mode, and drops the graphical object 1404 at location P2.

Overall, note that the drag-and-drop component 1210 maintains the drag-and-drop mode between locations P1 and P2 regardless of whether the user inadvertently removes his or her touch contact from the surface of the force-sensitive display device 106. In other words, this inadvertent break in continuity in the drag operation does not have the effect of aborting the drag-and-drop operation. The user may terminate the drag-and-drop operation by again pressing the surface of the touch-sensitive display device 106 with the predetermined force-dependent signal profile. Or the drag-and-drop component 1210 may automatically terminate this mode if the user fails to make an explicit force-dependent action in a prescribed time-out period. Generally, the above-described mode of operation is desirable for those users who, due to motor impairments, may have trouble maintaining sustained contact with the surface of an input device throughout a drag operation.

In a variation of the drag-and-drop operation described above, the user may press down on plural graphical objects in succession with the same force that has been applied to the graphical object 1404 (e.g., with the touch intensity value of $f > f_{threshold}$). The user may then drag the selected graphical objects as a group (while maintain the spatial interrelationships of the individual graphical objects during the move), or by individually dragging the selected graphical objects to respective different destinations. The user may discontinue the drag-and-drop operation by pressing down on one of the graphical objects that has been moved with the requisite force (e.g., with the touch intensity value of $> f_{threshold}$), or by performing this action with respect to each of the graphical objects that have been moved.

Figure 15:
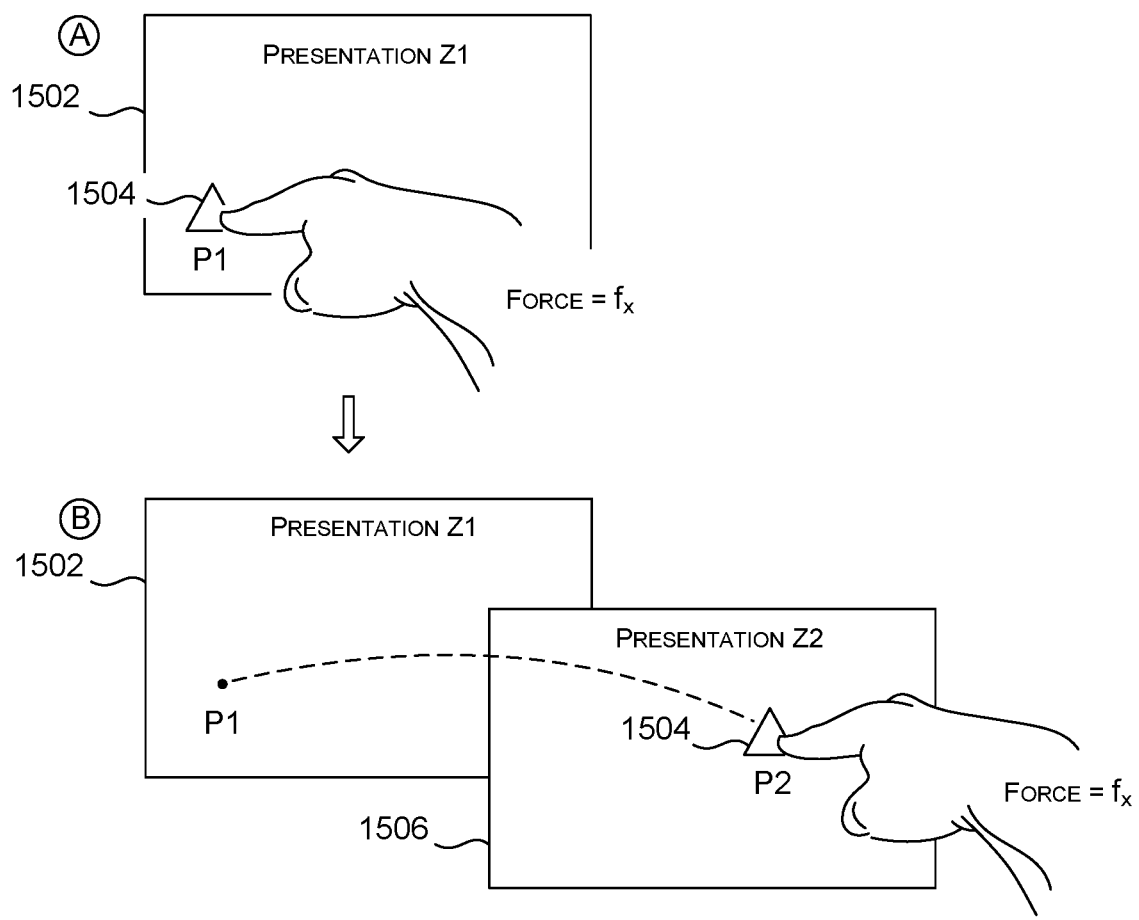
FIG. 15 shows another illustrative manner of operation of the drag-and-drop component; in this case, the user performs a drag-and-drop operation across two user interface presentations provided by two respective display devices.

FIG. 15 shows another illustrative manner of operation of the drag-and-drop component 1210. In state A, the user engages the surface of a first force-dependent display device at a location P1 with a prescribed degree (or profile) of force, e.g., with a touch intensity value of $f_x$, where $f_x > f_{threshold}$. This action corresponds to the user's interaction with a first user interface presentation (Z1) 1502 to select a graphical object 1504. In response to this operation, the drag-and-drop component 1210 invokes the drag-and-drop mode.

In state B, the user removes his or her touch contact from the user interface presentation (Z1) 1502 hosted by the first display device. The user subsequently applies his or her touch contact to the surface of a second force-sensitive display device at a location P2, with a prescribed amount (or profile) of force, e.g., corresponding to a touch intensity value of $f_x$, where $f_x > f_{threshold}$. The second display device hosts a second user interface presentation (Z2) 1506. In response, the drag-and-drop component 1210 terminates the drag-and-drop operation by effectively dropping the graphical object 1504 at location P2. The user can conceptualize this operation as picking up the graphical object 1504 with his or her finger, and teleporting it to a destination display device. This scenario further highlights the fact that the drag-and-drop operation carries out the drag-and-drop operation irrespective of whether or not the user maintains contact with an input surface of an input device throughout the drag-and-drop operation.

In some cases, the first display device and the second display device receive output information from the same computing device. In other cases, the first display device and the second display device are hosted by separate computing devices. In one scenario, the separate computing devices may be associated with a single user, e.g., via a single user account ID. In other cases, the separate computing devices are associated with two different individuals, and those individuals have taken appropriate configuration operations to authorize the transfer of graphical objects between their respective computing devices in the manner described above.

Figure 16:
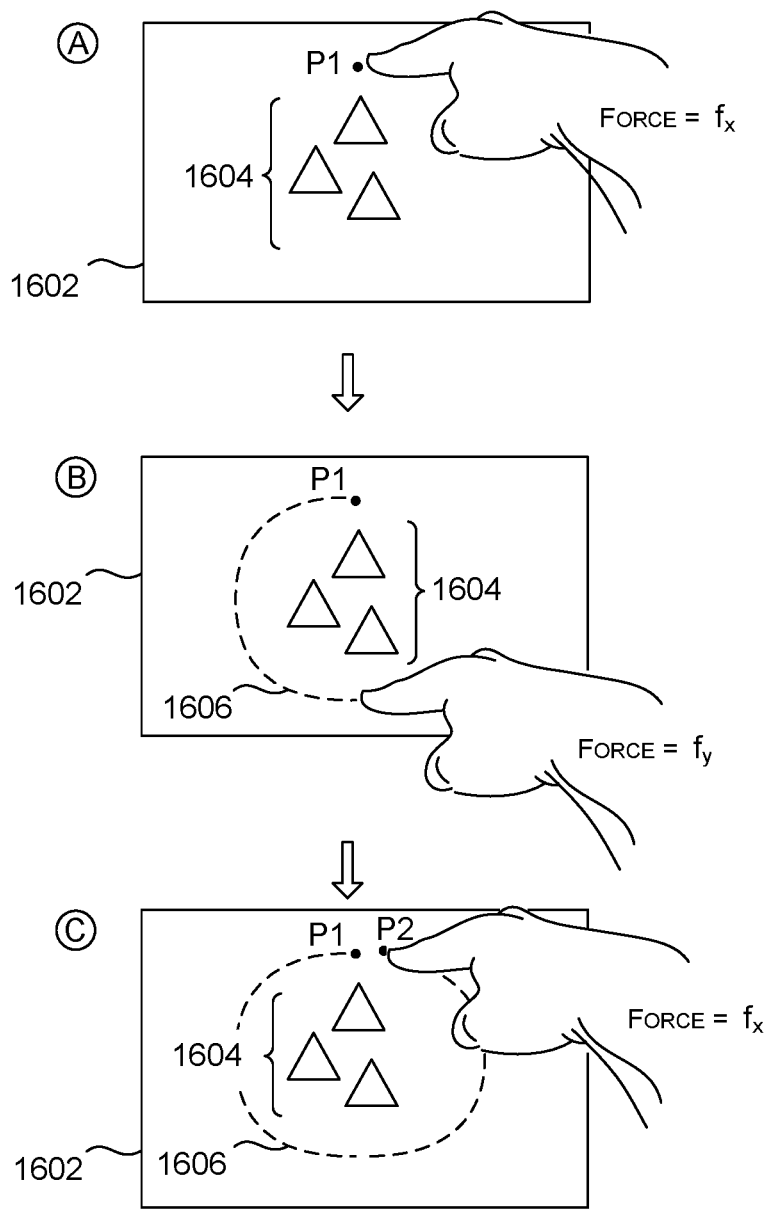
FIG. 16 shows one illustrative manner of operation of a selection component, which is another processing component shown in FIG. 12.

FIG. 16 shows one illustrative manner of operation of the selection component 1212. In state A, the user presses a location P1 on the surface of the force-sensitive display device 106 with a predetermined degree (or profile) of force, e.g., with a degree of force associated with touch intensity value $f_x$, where $f_x > f_{threshold}$. The display device 106 hosts a user interface presentation 1602, and the user interface presentation 1602, in turn, includes a collection of graphical objects 1604 that the user wishes to select. In response to detecting the user's action, the selection component 1212 invokes a selection control mode.

In state B, the user moves a touch contact from location P1 on the surface of the display device 106, while applying a second degree (or profile) of force, e.g., with a degree of force associated with a touch intensity value of $f_y$, where $f_y < f_x$, and where $f_y < f_{threshold}$. In response to detecting this action, the selection component 1212 traces out a selection path 1606 over the user interface presentation 1402.

In state C, the user presses location P2 on the surface of the display device 106 with a predetermined degree (or profile) of force, e.g., again with a degree (or profile) of force associated with a touch intensity value $f_x$. In response to detecting this operation, the selection component 1212 terminates the selection control mode, and selects the set of graphical objects 1604 encompassed by the user's selection path 1606. Overall, the selection component 1212 preserves the selection control mode even in the case in which the user removes the touch contact while tracing the selection path 1606. In the case in which the user inadvertently creates a small discontinuity in the selection path 1606 due to failure to maintain continuity of contact with the surface, the selection component 1212 can optionally fill in the missing portion of the selection path 1606, e.g., by drawing a line from the point of contact lift-off to the point of contact touch-down.

The selection component 1212 can also allow the user to draw two or more non-contiguous boundaries in a single selection operation, e.g., by encircling a first group of graphical objects with a first boundary, and then encircling a second group of graphical objects with a second boundary. The user designates the start of the selection operation by making a telltale force-dependent actuation at the start of drawing the first boundary. The user designates the end of the selection operation by making another telltale force-dependent actuation at the end of drawing the second boundary. The user lifts his or finger between drawings these two boundaries, but that action does not abort the selection mode because the user has not yet explicitly terminated the mode via a telltale force-dependent actuation. Indeed, the user can even select plural graphical objects on two or more user interface presentations in this manner (provided by one or more display devices).

Figure 17:
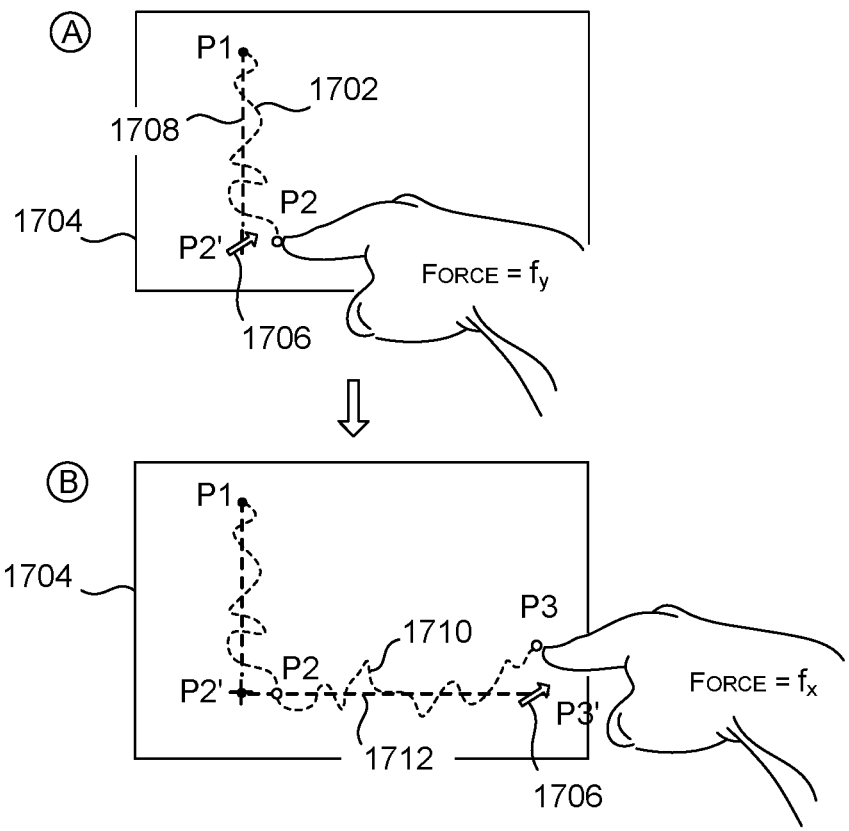
FIG. 17 shows one illustrative manner of operation of an axis-locked movement component, which is another processing component shown in FIG. 12.

FIG. 17 shows one illustrative manner of operation of the axis-locked movement component 1214. In state A, the user moves a touch contact on the surface of the force-sensitive display device 106 from location P1 to location P2 over a path 1702, while maintaining a degree of force associated with the touch intensity value $f_y$. Assume that the touch intensity value $f_y$ lies within a prescribed range of touch intensity values that have been associated, in advance, with the y axis. Also assume that the display device 106 hosts a user interface presentation 1704 which includes a cursor 1706. In response to detecting the user's operation, the axis-locked movement component 1214 moves the cursor 1706 along a path 1708 (rather the actual path 1702 of the touch contact) to a location P2', where the path 1708 is locked to the y axis. The location P2' has the same y coordinate value as the location P2, but may have a different x coordinate value compared to the location P2.

In state B, the user moves a touch contact on the surface of the force-sensitive display device 106 from location P2 to location P3 over a path 1710, while maintaining a degree of force associated with a touch intensity value $f_x$. Assume that the touch intensity value $f_x$ lies within a prescribed range of touch intensity values that have been associated, in advance, with the x axis. In response to detecting this operation, the axis-locked movement component 1214 moves the cursor 1706 along a path 1712 (rather the actual path 1710 of the touch contact) to a location P3', where the path is locked to the x axis. The location P3' has the same x coordinate value as the location P3, but may have a different y coordinate value compared to the location P3.

Overall, the axis-locked movement component 1214 allows the user to move a cursor (or any other graphical object) in a piecemeal manner, wherein, in each stage, the movement is locked to particular axis. The axis is selected by the degree (or profile) of force that the user applies to the surface of the input device. In the example of FIG. 17, the user applies the requisite degree of force over the course of the movement operation. But in other implementations, the user can lock onto an axis by performing an initial force actuation of a predetermined nature, e.g., in the manner described above with respect to the drag-and-drop component 1210 and the selection component 1212.

Figure 18:
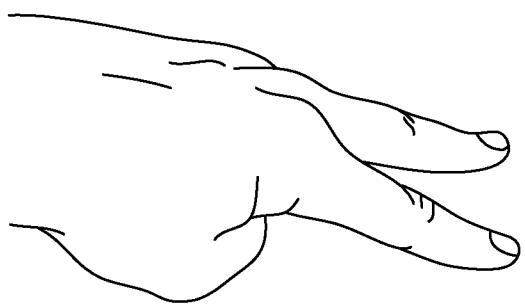
FIGS. 18 and 19 show multi-touch contacts that a user may apply to a touch-sensitive surface in the context of any of the processing components introduced above.
Figure 19:
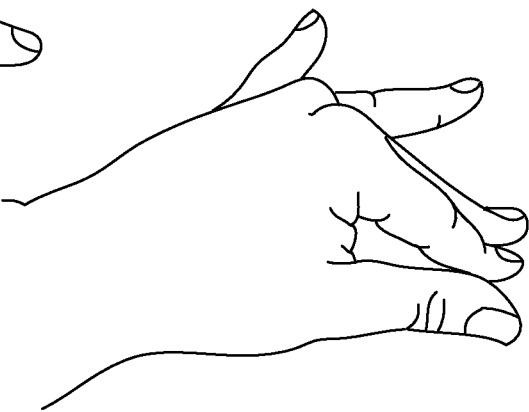

FIGS. 18 and 19 show multi-touch contacts that a user may apply to a force-sensitive surface in the context of any of the processing components introduced above. In the case of FIG. 18, the user applies two fingers to the surface of an input device. In the case of FIG. 19, the user applies three fingers to the surface of an input device. In one case, a processing component can determine that the user has pressed the surface of an input device with two or more touch contacts by comparing input signals produced by the user's action with predetermined pattern information associated with a multi-touch contact action.

Any processing component can incorporate a rule which interprets a force-dependent contact that involves any number of simultaneous contacts with the surface of an input device, and any manner of applying those plural contacts. For example, the computing device 102 can determine that a user is performing a characteristic input action when the user simultaneously applies a predetermined amount (or profile) of force to the surface of an input device using k fingers. For example, the computing device 102 can determine that the user is invoking the magnification component 312 when the user presses the surface of the input device with a single finger. The computing device 102 can determine that the user is invoking the speed selection component 316 when the user activates the input surface using two fingers, and so on. In other cases, the computing device 102 can interpret the user's action based on other contextual evidence, such as the user's explicit selection of a desired control mode, in which the use specifies that a particular touch should be interpreted as activating a particular processing component, and not another processing component.

In another implementation, the user may mimic a multi-touch force-dependent contact by pressing down on the surface of the input device in quick succession (at the same location) with a requisite degree of force (or with a requisite force profile). For example, the selection component 1212 can initiate its selection control mode by requiring the user to press down firmly at location P1 twice in succession. In contrast, the drag-and-drop component 1210 can initiate its drag-and-drop operation by receiving only a single firm actuation at an initial location P1. By virtue of these gestures, the computing device 102 can distinguish input actions directed to the selection component 1212 from input actions directed to the drag-and-drop component 1210. Still other ways of disambiguating force-dependent input actions are possible; the above examples are cited by way of illustration, not limitation.

In other cases, the computing device 102 can provide a rule which invokes any multi-touch gesture (such as a two-finger scrolling gesture) in response to detecting either of two occurrences. In other words, the computing device 102 allows a user to invoke a multi-touch gesture in at least two ways. In a first way, the computing device 102 detects that the user actuates the surface of an input device using two or more simultaneous touch contacts in a prescribed manner (where those touch contacts need not correspond to force-dependent actuations). In a second way, the computing device 102 detects that the user performs two or more force-dependent actuations on the surface of the input device in temporal succession. This manner of operation provides flexibility to users with disabilities. For instance, such a user may not be able to invoke a multi-touch gesture in the first manner (by applying plural simultaneous contacts), but may be able to invoke the gesture in the second manner (by applying plural successive force-dependent actuations).

In yet other cases, the user can perform two independent force-dependent gestures with two respective fingers, where those gesture invoke different processing components. For example, the user can press the surface of an input device with a first finger in a characteristic manner to invoke the magnification component 312, and simultaneously press the surface of the input device with a second finger to invoke the speed selection component 316.

In conclusion to Section A, all of the processing components described herein can be regarded as assistive technology (AT) components, meaning that they correspond to mechanisms that allow a user with disabilities to interact with a computing device. The processing components provide this assistance without introducing cumbersome, error-prone and difficult-to-learn tools.

More specifically, the processing components 302 shown in FIG. 3 are particularly useful for users with various vision-related impairments. For instance, the magnification component 312 and the clarification component 314 provide a way of increasing the readability of a user interface presentation. The speed selection component 316 and the scope selection component 318 provide an efficient way of converting visual information to spoken information.

The movement damping component 1002, drag-and-drop component 1210, selection component 1212, and axis-locked movement component 1214 are particularly useful for users with various motor-impairments. For instance, these components reduce the negative effects of the user's inadvertent movement during interactions with the user interface presentation. The voice command component 1208 provides an alternative way for a user to interact with the computing device, e.g., by reducing reliance on touch-based interaction with a graphical user interface presentation.

As used herein, the term "disabilities" has broad connotation. It pertains to users who have permanent physical and/or mental disabilities. It also pertains to users who may confront temporary disabilities in certain situations. For example, a user who is carrying a package while interacting with a computing device can be said to confront a temporary motor-related disability. Similarly, a user who is attempting to interact with a computing device in dim lighting confronts another kind of temporary vision-related disability.

B. Illustrative Process

FIG. 20 shows a process 2202 that explains the operation of the computing device 102 of Section A in flowchart form. Since the principles underlying the operation of the computing device 102 have already been described in Section A, certain operations will be addressed in summary fashion in this section. As noted in the prefatory part of the Detailed Description, the flowchart is expressed as a series of operations performed in a particular order. But the order of these operations is merely representative, and can be varied in any manner.

In block 2004, the computing device 102 receives input signals from an input device. The input signals include at least one signal component that reflects a degree of force at which a user presses against a surface of the input device. In block 2006, the computing device determines, based on the input signals, whether the user has performed a force-dependent actuation in which the user presses the surface of the input device with a prescribed force-dependent signal profile, e.g., by pressing the surface with an amount of force to produce a desired touch intensity value f within a range of possible touch intensity values (as in the case of the examples of Subsection A.2), or by pressing the surface with an amount of force that is above a prescribed threshold $f_{threshold}$ (as with some of the examples of Subsection A.3). In block 2008, the computing device activates a prescribed control mode in response to determining that the user has performed the force-dependent actuation. In block 2010, the computing device 102 provides an assistive technology user interface experience in response to the control mode that has been activated. The assistive technology user interface experience corresponds to an experience that is configured to assist users with visual and/or motor impairments in interacting with a user interface presentation of the computing device.

C. Representative Computing Functionality

Figure 21:
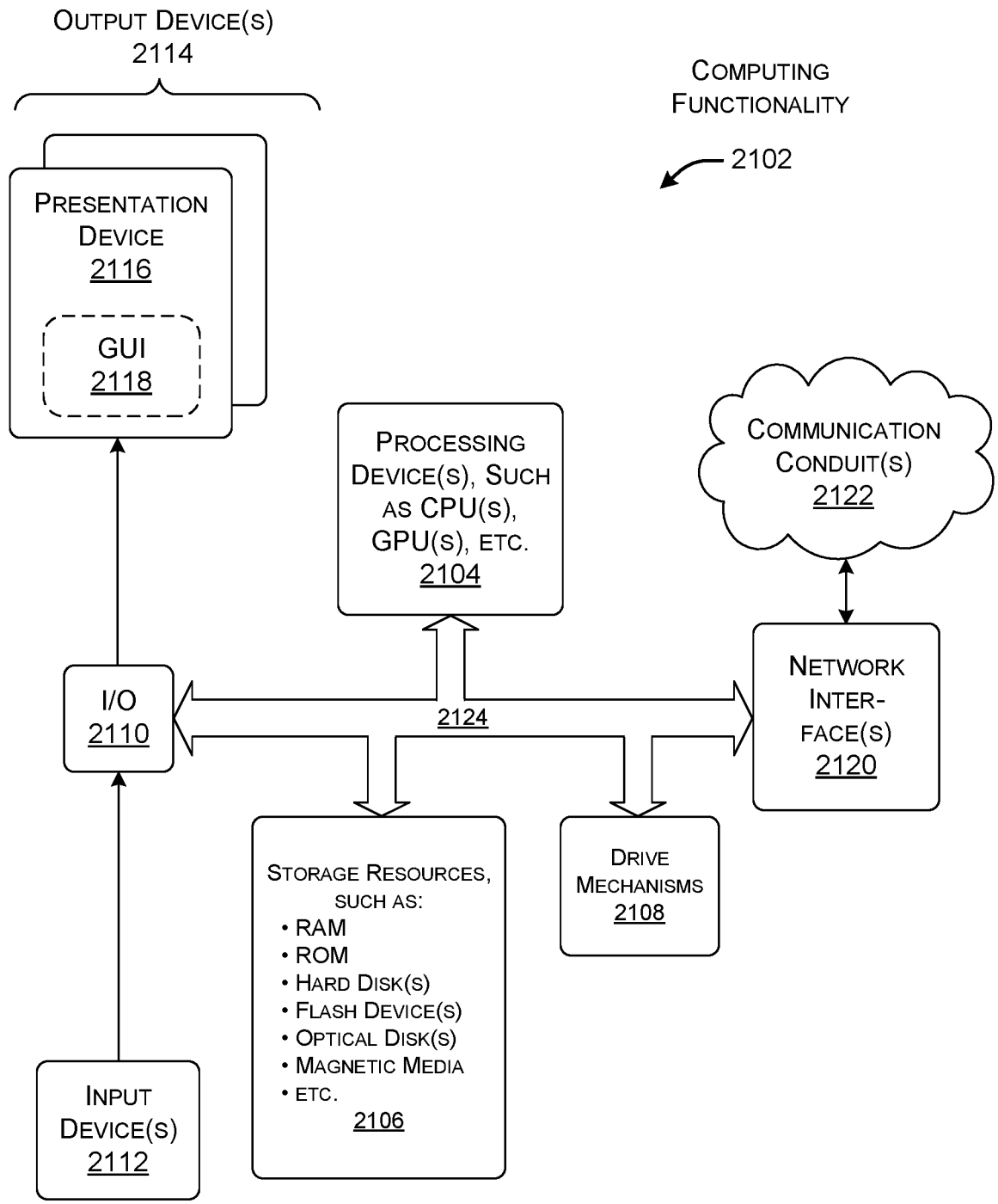
FIG. 21 shows illustrative computing functionality that can be used to implement any aspect of the features shown in the foregoing drawings.

FIG. 21 shows computing functionality 2102 that can be used to implement any aspect of the mechanisms set forth in the above-described figures. For instance, the type of computing functionality 2102 shown in FIG. 21 can be used to implement any user computing device 102 shown in FIGS. 1 and 2. In all cases, the computing functionality 2102 represents one or more physical and tangible processing mechanisms.

The computing functionality 2102 can include one or more hardware processor devices 2104, such as one or more central processing units (CPUs), and/or one or more graphics processing units (GPUs), and so on. The computing functionality 2102 can also include any storage resources (also referred to as computer-readable storage media or computer-readable storage medium devices) 2106 for storing any kind of information, such as machine-readable instructions, settings, data, etc. Without limitation, for instance, the storage resources 2106 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 2102. The computing functionality 2102 may perform any of the functions described above when the hardware processor device(s) 2104 carry out computer-readable instructions stored in any storage resource or combination of storage resources. For instance, the computing functionality 2102 may carry out computer-readable instructions to perform each block of the process 2002 described in Section B. The computing functionality 2102 also includes one or more drive mechanisms 2108 for interacting with any storage resource, such as a hard disk drive mechanism, an optical disk drive mechanism, and so on.

The computing functionality 2102 also includes an input/output component 2110 for receiving various inputs (via input devices 2112), and for providing various outputs (via output devices 2114). Illustrative input devices include any of the input devices described above in the context of FIG. 1. One particular output mechanism may include a display device 2116 and an associated graphical user interface presentation (GUI) 2118. Other output devices include a printer, one or more speakers, a haptic output mechanism, an archival mechanism (for storing output information), and so on. The computing functionality 2102 can also include one or more network interfaces 2120 for exchanging data with other devices via one or more communication conduits 2122. One or more communication buses 2124 communicatively couple the above-described components together.

The communication conduit(s) 2122 can be implemented in any manner, e.g., by a local area computer network, a wide area computer network (e.g., the Internet), point-to-point connections, etc., or any combination thereof. The communication conduit(s) 2122 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2102 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described for facilitating interaction with a computing device. The method includes: receiving input signals from an input device, the input signals including at least one signal component that reflects a degree of force at which a user presses against a surface of the input device; determining, based on the input signals, whether the user has performed a force-dependent actuation in which the user presses the surface of the input device with a prescribed force-dependent signal profile; activating a prescribed control mode in response to determining that the user has performed the force-dependent actuation; and providing an assistive technology user interface experience in response to the control mode that has been activated. The assistive technology user interface experience corresponds to an experience that is configured to assist users with visual and/or motor impairments in interacting with a user interface presentation of the computing device.

According to a second aspect, the determining operation involves determining that the user has applied the force-dependent actuation to a selected location on the user interface presentation. The activating operation involves activating an active listening control mode. And the providing operation involves: receiving additional input signals that are produced in response to detecting information spoken by the user; and interpreting the information spoken by the user with respect to a context established by the selected location.

According to a third aspect, the determining operation involves determining that the user has applied the force-dependent actuation to at least one graphical object on the user interface presentation. The activating operation involves activating a drag-and-drop control mode. And the providing operation involves: receiving additional input signals that are produced in response to movement of the graphical object(s) by the user from a first location on the user interface presentation to a second location, via corresponding movements on the surface of the input device; and moving the graphical object(s) from the first location to the second location, without regard to whether the user maintains continuity in physical contact with the surface of the input device throughout the movement.

According to a fourth aspect, the method further includes: receiving further input signals from the input device; determining, based on the further input signals, whether the user has performed another force-dependent actuation in which the user presses the surface of the input device, while at the second location, with a prescribed force-dependent signal profile; and deactivating the drag-and-drop control mode in response to determining that the user has performed the other force-dependent actuation.

According to a fifth aspect, the determining operation involves determining that the user has applied the force-dependent actuation to a first location on the user interface presentation. The activating operation involves activating a selection control mode. And the providing operation involves: receiving additional input signals that are produced in response to tracing, by the user, of at least one path on the user interface presentation, via corresponding movements on the surface of the input device; and selecting content that is associated with an area defined by the path(s).

According to a sixth aspect, the providing operation involves responding to a gesture on a single user interface presentation provided by the computing device.

According to a seventh aspect, the providing operation involves responding to a gesture across two user interface presentations provided by the computing device, or two respective computing devices.

According to an eighth aspect, the determining operation involves determining that the user has applied the force-dependent actuation to a first location on the user interface presentation. The activating operation involves activating an axis-locked control mode. And the providing operation involves: moving a graphical object along a path locked to an axis, in response to corresponding movements on the surface of the input device by the user. More specifically, the computing device selects a first axis when the force-dependent actuation exhibits a first prescribed amount of force, and the computing device selecting a second axis when the force-dependent actuation exhibits a second prescribed amount of force.

According to a ninth aspect, the determining operation involves identifying a touch intensity value that describes the degree of force at which a user presses against the surface of the input device, the touch intensity value corresponding to a value within a range of more than two possible touch intensity values. The providing operation includes: determining one or more aspect values of the user interface presentation provided by the computing device, as a function of the touch intensity value; and providing the user interface presentation on one or more output devices, the user interface presentation being specified, in part, by the aspect value(s). Each aspect value varies with increasing touch intensity values, over a range of aspect values including more than two aspect values.

According to a tenth aspect, an aspect value that is determined corresponds to a level of magnification at which the computing device presents information within at least one part of the user interface presentation.

According to an eleventh aspect, an aspect value that is determined corresponds to a level of clarity at which the computing device presents information within at least one part of the user interface presentation, the level of clarity being based on a composition of the information.

According to a twelfth aspect, the level of clarity corresponds to one or more of: a level of contrast associated with the information that is presented by the computing device; and/or a level of complexity associated with the information that is presented by the computing device; and/or a density at which information is presented by the computing device, the density relating to a spatial arrangement of pieces of the information; and/or a quantity of other user interface events which compete with the information.

According to a thirteenth aspect, an aspect value that is determined corresponds to a speed at which the computing device delivers information to the user.

According to a fourteenth aspect, an aspect value that is determined corresponds to an informational scope at which the computing device delivers information to the user.

According to a fifteenth aspect, an aspect value corresponds to a level of damping that the computing device applies to movement of a graphical object on the user interface presentation, with respect to corresponding movement of a touch contact over the surface of the input device. Further, the providing operation involves dynamically producing a range of levels of damping in response to different intensities at which the user presses against the surface of the input device.

According to a sixteenth aspect, the determining operation further includes determining, based on the input signals, that the user has made two or more touch contacts with the surface of the input device, at a same time, or in temporal succession.

According to a seventeenth aspect, one or more computing devices are described for providing a user interface experience. The computing device(s) includes: a device driver configured to receive input signals from an input device, the input signals including at least one signal component that reflects a degree of force at which a user presses against a surface of the input device; an interpretation component configured to determine, based on the input signals, whether the user has performed a force-dependent actuation in which the user presses the surface of the input device with a prescribed force-dependent signal profile; and a control component configured to: activate a prescribed control mode in response to determining that the user has performed the force-dependent actuation; and provide an assistive technology user interface experience in response to the control mode that has been activated. The assistive technology user interface experience corresponds to an experience that is configured to assist users with visual and/or motor impairments in interacting with a user interface presentation provided by the computing device(s).

According to an eighteenth aspect, the control component is configured to provide the assistive technology user interface experience while operating in the prescribed control mode, regardless of whether the user maintains continuity of contact with the surface of the user input device.

According to a nineteenth aspect, the interpretation component is configured to identify a touch intensity value that describes the degree of force at which a user presses against the surface of the input device, the touch intensity value corresponding to a value within a range of more than two possible touch intensity values. The control component is configured to provide the assistive technology user interface experience by: determining one or more aspect values of the user interface presentation provided by the computing device(s), as a function of the touch intensity value; and provide the user interface presentation on one or more output devices, the user interface presentation being specified, in part, by the aspect value(s). Each aspect value varies with increasing touch intensity values, over a range of aspect values including more than two aspect values.

According to a twentieth aspect, a computer-readable storage medium is described for storing computer-readable instructions. The computer-readable instructions, when executed by one or more processor devices of a computing device, perform a method that includes: receiving input signals from an input device, the input signals including at least one signal component that reflects a degree of force at which a user presses against a surface of the input device; determining, based on the input signals, whether the user has performed a force-dependent actuation in which the user presses the surface of the input device with a prescribed force-dependent signal profile; activating a prescribed control mode in response to determining that the user has performed the force-dependent actuation; and providing an assistive technology user interface experience in response to the control mode that has been activated. The assistive technology user interface experience corresponds to an experience that is configured to increase a readability of information presented on a user interface presentation, and/or to reduce a consequence of inadvertent movement by the user when interacting with the surface of the computing device.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for facilitating interaction with a computing device, the method comprising:
   receiving input signals from an input device, the input signals including at least one signal component that reflects a touch applied to a surface of the input device;
   determining, based at least on the input signals, a touch intensity value that describes a degree of force applied to the surface of the input device by the touch, the touch intensity value being within a range of more than two possible touch intensity values;
   activating a control mode in response to receiving the input signals; and
   providing an assistive technology user interface experience in response to the control mode that has been activated, the assistive technology user interface experience involving:
      initially presenting information in a particular font that has ornamental embellishments;
      initially arranging the information into a single column; and
      as the touch intensity value changes over time:
         when the touch intensity value exceeds a first threshold, changing the particular font to another font that lacks the ornamental embellishments;
         when the touch intensity value exceeds a second threshold that is greater than the first threshold, bolding the another font; and
         when the touch intensity value exceeds a third threshold that is greater than the second threshold, rearranging the information by partitioning the single column into two columns.

2. The method of claim 1, further comprising: based at least on the touch intensity value, determining a specified level of magnification at which the computing device presents the information within at least one part of a display.

3. The method of claim 1, further comprising:
   when the touch intensity value exceeds the first threshold, magnifying the information shown in the another font at a first magnification level; and
   when the touch intensity value exceeds the second threshold that is greater than the first threshold, magnifying the information shown in the bolded another font at a second magnification level that is greater than the first magnification level.

4. One or more computing devices comprising:
   a processing device; and
   a storage resource storing machine-readable instructions which, when executed by the processing device, cause the processing device to: receive input signals from an input device, the input signals including at least one signal component that reflects a touch applied to a surface of the input device;
   determine, based at least on the input signals, a touch intensity value that describes a degree of force applied to the surface of the input device by the touch, the touch intensity value being within a range of more than two possible touch intensity values; and
   activate a control mode in response to receiving the input signals; and
   provide an assistive technology user interface experience in response to the control mode that has been activated, the assistive technology user interface experience involving:
      initially presenting information including a plurality of graphical elements;
      distinguishing between interactive graphical elements and non-interactive graphical elements in the plurality of graphical elements; and
      as the touch intensity value increases, rearranging the plurality of graphical elements by increasing separation between the interactive graphical elements more than separation between the non-interactive graphical elements.

5. A computer-readable storage medium storing computer-readable instructions, the computer-readable instructions, when executed by one or more processor devices of a computing device, performing a method that comprises:
   receiving input signals from an input device, the input signals including at least one signal component that reflects a touch against a surface of the input device;
   determining, based at least on the input signals, a touch intensity value that describes a degree of force applied to the surface of the input device by the touch, the touch intensity value being within a range of more than two possible touch intensity values;
   activating a control mode in response to receiving the input signals; and
   providing an assistive technology user interface experience in response to the control mode that has been activated, the assistive technology user interface experience involving:
   initially presenting information including a plurality of graphical elements; and
   as the touch intensity value increases, rearranging the plurality of graphical elements in a manner that is inversely proportional to respective sizes of each of the individual graphical elements such that smaller sized graphical elements are moved further apart than larger sized graphical elements.

6. The computer-readable storage medium of claim 5, wherein the plurality of graphical elements are rearranged in a manner that avoids collision of the graphical elements.

* * * * *